(12) United States Patent
Bassett

(10) Patent No.: US 11,083,134 B2
(45) Date of Patent: Aug. 10, 2021

(54) AGRICULTURAL INTER-ROW MOWING DEVICE

(71) Applicant: Underground Agriculture, LLC, Sycamore, IL (US)

(72) Inventor: Joseph D. Bassett, Sycamore, IL (US)

(73) Assignee: Underground Agriculture, LLC, Sycamore, IL (US)

( * ) Notice: Subject to any disclaimer, the term of this patent is extended or adjusted under 35 U.S.C. 154(b) by 333 days.

(21) Appl. No.: 16/194,143

(22) Filed: Nov. 16, 2018

(65) Prior Publication Data

US 2019/0082591 A1 Mar. 21, 2019

Related U.S. Application Data

(63) Continuation-in-part of application No. 15/941,613, filed on Mar. 30, 2018, now Pat. No. 10,980,174, (Continued)

(51) Int. Cl.
*A01D 34/835* (2006.01)
*A01D 34/66* (2006.01)
(Continued)

(52) U.S. Cl.
CPC ......... *A01D 34/835* (2013.01); *A01D 34/661* (2013.01); *A01D 34/662* (2013.01);
(Continued)

(58) Field of Classification Search
CPC ....... A01B 39/08; A01B 39/085; A01B 39/14; A01B 39/18; A01M 21/00; A01M 21/02;
(Continued)

(56) References Cited

U.S. PATENT DOCUMENTS

| 114,002 A | 4/1871 | Godfrey |
| 123,966 A | 2/1872 | Wing |

(Continued)

FOREIGN PATENT DOCUMENTS

| BE | 551372 | 10/1956 |
| CA | 530673 | 9/1956 |

(Continued)

OTHER PUBLICATIONS

Case Corporation Brochure, Planters 900 Series Units/Modules Product Information, Aug. 1986 (4 pages).

(Continued)

*Primary Examiner* — Adam J Behrens
(74) *Attorney, Agent, or Firm* — Nixon Peabody LLP

(57) ABSTRACT

An agricultural mowing device includes a shaft, a first cutting device, and a second cutting device. The shaft has an upper section, a middle section, and a lower section. The shaft is advanced in a field between two adjacent rows of planted matter. The first cutting device is mounted to the lower section of the shaft. The first cutting device extends laterally from the shaft to a distance covering only a distance between the two adjacent rows. The first cutting device cuts plant matter that grows between the two adjacent rows. The second cutting device is mounted to the middle section of the shaft. The second cutting device extends laterally from the shaft to a distance covering at least a portion of at least one of the two adjacent rows. The second cutting device cuts plant matter that grows in the at least one of the two adjacent rows.

18 Claims, 28 Drawing Sheets

Related U.S. Application Data which is a continuation-in-part of application No. 15/392,731, filed on Dec. 28, 2016, now Pat. No. 10,477,760.

(60) Provisional application No. 62/271,770, filed on Dec. 28, 2015.

(51) Int. Cl.
| | |
|---|---|
| *A01D 34/81* | (2006.01) |
| *A01D 69/03* | (2006.01) |
| *A01D 67/00* | (2006.01) |
| *A01D 69/02* | (2006.01) |
| *A01M 21/02* | (2006.01) |

(52) U.S. Cl.
CPC ............ *A01D 34/81* (2013.01); *A01D 67/00* (2013.01); *A01D 69/02* (2013.01); *A01D 69/03* (2013.01); *A01M 21/02* (2013.01)

(58) Field of Classification Search
CPC ...... A01D 34/00; A01D 34/03; A01D 34/032; A01D 34/661; A01D 34/662; A01D 34/81; A01D 34/835; A01D 34/863; A01D 67/00; A01D 69/02; A01D 69/03
See application file for complete search history.

(56) References Cited

U.S. PATENT DOCUMENTS

| | | |
|---|---|---|
| 321,906 A | 7/1885 | McCormick |
| 353,491 A | 2/1886 | Wells |
| 523,508 A | 7/1894 | Bauer |
| 736,369 A | 8/1903 | Dynes |
| 803,088 A | 10/1905 | Barker |
| 1,069,264 A | 8/1913 | Keller |
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casaday |
| 1,321,040 A | 11/1919 | Hoffman |
| 1,391,593 A | 9/1921 | Sweeting |
| 1,398,668 A | 11/1921 | Bordsen |
| 1,442,032 A | 1/1923 | Luce |
| 1,481,981 A | 1/1924 | Boye |
| 1,791,462 A | 2/1931 | Bermel |
| 1,844,255 A | 2/1932 | Kaupke |
| 1,901,299 A | 3/1933 | Johnson |
| 1,901,778 A | 3/1933 | Schlag |
| 1,938,132 A | 12/1933 | Broemmelsick |
| 2,014,334 A | 9/1935 | Johnson |
| 2,044,304 A | 6/1936 | James |
| 2,058,539 A | 10/1936 | Welty |
| 2,213,600 A | 9/1940 | Wetmore |
| 2,249,637 A | 7/1941 | Rietz |
| 2,269,051 A | 1/1942 | Cahoy |
| 2,285,932 A | 6/1942 | Leavitt |
| 2,298,539 A | 10/1942 | Mott |
| 2,341,143 A | 2/1944 | Herr |
| 2,505,276 A | 4/1950 | Boroski |
| 2,561,763 A | 7/1951 | Waters |
| 2,593,176 A | 4/1952 | Patterson |
| 2,596,527 A | 5/1952 | Bushong |
| 2,611,306 A | 9/1952 | Strehlow |
| 2,612,827 A | 10/1952 | Baggette |
| 2,664,040 A | 12/1953 | Beard |
| 2,691,353 A | 10/1954 | Secondo |
| 2,692,544 A | 10/1954 | Jessup |
| 2,715,286 A | 8/1955 | Saveson |
| 2,754,622 A | 7/1956 | Rohnert |
| 2,878,633 A | 10/1956 | Mullin |
| 2,771,044 A | 11/1956 | Putifer |
| 2,773,343 A | 12/1956 | Oppel |
| 2,777,373 A | 1/1957 | Pursche |
| 2,799,234 A | 7/1957 | Chancey |
| 2,805,574 A | 9/1957 | Jackson, Jr. |
| 2,860,716 A | 11/1958 | Flock |
| 2,925,872 A | 2/1960 | Darnell |
| 2,960,358 A | 11/1960 | Christison |
| 3,010,744 A | 11/1961 | Hollis |
| 3,014,547 A | 12/1961 | Van der Lely |
| 3,038,424 A | 6/1962 | Johnson |
| 3,042,121 A | 7/1962 | Broetzman |
| 3,057,092 A | 10/1962 | Curlett |
| 3,058,243 A | 10/1962 | McGee |
| 3,065,879 A | 11/1962 | Jennings |
| 3,080,004 A | 3/1963 | McNair |
| 3,082,829 A | 3/1963 | Buddingh |
| 3,103,993 A | 9/1963 | Gies |
| 3,110,973 A | 11/1963 | Reynolds |
| 3,115,739 A | 12/1963 | Thoen |
| 3,122,901 A | 3/1964 | Thompson |
| 3,123,152 A | 3/1964 | Biskis |
| 3,188,989 A | 6/1965 | Johnston |
| 3,213,514 A | 10/1965 | Evans |
| 3,256,942 A | 4/1966 | Van Sickle |
| 3,250,109 A | 5/1966 | Spyridakis |
| 3,261,150 A | 7/1966 | Fitzgerald |
| 3,314,278 A | 4/1967 | Bergman |
| 3,319,589 A | 5/1967 | Moran |
| 3,351,139 A | 11/1967 | Schmitz |
| 3,355,930 A | 12/1967 | Fedorov |
| 3,368,788 A | 2/1968 | Padula |
| 3,368,789 A | 2/1968 | Martin |
| 3,370,450 A | 2/1968 | Scheucher |
| 3,397,933 A | 8/1968 | Hatcher |
| 3,420,273 A | 1/1969 | Greer |
| 3,433,474 A | 3/1969 | Piret |
| 3,447,495 A | 6/1969 | Miller |
| 3,498,036 A | 3/1970 | Cowling |
| 3,500,937 A | 3/1970 | Erickson |
| 3,507,233 A | 4/1970 | Greig |
| 3,539,020 A | 11/1970 | Andersson |
| 3,543,603 A | 12/1970 | Gley |
| 3,561,541 A | 2/1971 | Woelfel |
| 3,576,098 A | 4/1971 | Brewer |
| 3,581,685 A | 6/1971 | Taylor |
| 3,593,720 A | 7/1971 | Botterill |
| D221,461 S | 8/1971 | Hagenstad |
| 3,599,403 A | 8/1971 | Gantz |
| 3,606,745 A | 9/1971 | Girodat |
| 3,635,495 A | 1/1972 | Orendorff |
| 3,650,334 A | 3/1972 | Hagenstad |
| 3,653,446 A | 4/1972 | Kalmon |
| 3,701,327 A | 10/1972 | Krumholz |
| 3,708,019 A | 1/1973 | Ryan |
| 3,711,974 A | 1/1973 | Webb |
| 3,718,191 A | 2/1973 | Williams |
| 3,749,035 A | 7/1973 | Cayton |
| 3,753,341 A | 8/1973 | Berg, Jr. |
| 3,766,988 A | 10/1973 | Whitesides |
| 3,774,446 A | 11/1973 | Diehl |
| 3,795,291 A | 3/1974 | Naito |
| 3,906,814 A | 9/1975 | Magnussen |
| 3,939,846 A | 2/1976 | Drozhzhin |
| 3,945,532 A | 3/1976 | Marks |
| 3,970,012 A | 7/1976 | Jones |
| 3,975,890 A | 8/1976 | Rodger |
| 3,986,464 A | 10/1976 | Uppiano |
| 4,008,557 A * | 2/1977 | Ruback .................. A01D 45/10 56/63 |
| 4,009,668 A | 3/1977 | Brass |
| 4,018,101 A | 4/1977 | Mihalic |
| 4,044,697 A | 8/1977 | Swanson |
| 4,055,126 A | 10/1977 | Brown |
| 4,058,171 A | 11/1977 | Van der Lely |
| 4,063,597 A | 12/1977 | Day |
| 4,069,029 A | 1/1978 | Hudson |
| 4,096,730 A | 6/1978 | Martin |
| 4,099,576 A | 7/1978 | Jilani |
| 4,104,851 A | 8/1978 | Perry |
| 4,122,715 A | 10/1978 | Yokoyama |
| 4,129,082 A | 12/1978 | Betulius |
| 4,135,349 A | 1/1979 | Schwertner |

(56) References Cited

U.S. PATENT DOCUMENTS

| | | | |
|---|---|---|---|
| 4,141,200 | A | 2/1979 | Johnson |
| 4,141,302 | A | 2/1979 | Morrison, Jr. |
| 4,141,676 | A | 2/1979 | Jannen |
| 4,142,589 | A | 3/1979 | Schlagenhauf |
| 4,147,305 | A | 4/1979 | Hunt |
| 4,149,475 | A | 4/1979 | Bailey |
| 4,157,661 | A | 6/1979 | Schindel |
| 4,161,090 | A | 7/1979 | Watts, Jr. |
| 4,173,259 | A | 11/1979 | Heckenkamp |
| 4,182,099 | A | 1/1980 | Davis |
| 4,187,916 | A | 2/1980 | Harden |
| 4,191,262 | A | 3/1980 | Sylvester |
| 4,194,575 | A | 3/1980 | Whalen |
| 4,196,567 | A | 4/1980 | Davis |
| 4,196,917 | A | 4/1980 | Oakes |
| 4,206,817 | A | 6/1980 | Bowerman |
| 4,208,974 | A | 6/1980 | Dreyer |
| 4,213,408 | A | 7/1980 | West |
| 4,225,191 | A | 9/1980 | Knoski |
| 4,233,803 | A | 11/1980 | Davis |
| 4,241,674 | A | 12/1980 | Mellinger |
| 4,249,613 | A | 2/1981 | Scribner |
| 4,280,419 | A | 7/1981 | Fischer |
| 4,294,181 | A | 10/1981 | Smith |
| 4,295,532 | A | 10/1981 | Williams |
| 4,301,870 | A | 11/1981 | Carre |
| 4,307,674 | A | 12/1981 | Jennings |
| 4,311,104 | A | 1/1982 | Steilen |
| 4,317,355 | A | 3/1982 | Hatsuno |
| 4,359,101 | A | 11/1982 | Gagnon |
| 4,375,837 | A | 3/1983 | van der Lely |
| 4,377,979 | A | 3/1983 | Peterson |
| 4,384,444 | A | 5/1983 | Rossler |
| 4,391,335 | A | 7/1983 | Birkenbach |
| 4,398,608 | A | 8/1983 | Boetto |
| 4,407,371 | A | 10/1983 | Hohl |
| 4,407,660 | A | 10/1983 | Nevens |
| 4,413,685 | A | 11/1983 | Gremelspacher |
| 4,430,952 | A | 2/1984 | Murray |
| 4,433,568 | A | 2/1984 | Kondo |
| 4,438,710 | A | 3/1984 | Paladino |
| 4,445,445 | A | 5/1984 | Sterrett |
| 4,461,355 | A | 7/1984 | Peterson |
| 4,481,830 | A | 11/1984 | Smith |
| 4,499,775 | A | 2/1985 | Lasoen |
| 4,506,610 | A | 3/1985 | Neal |
| 4,508,178 | A | 4/1985 | Cowell |
| 4,528,920 | A | 7/1985 | Neumeyer |
| 4,530,405 | A | 7/1985 | White |
| 4,537,262 | A | 8/1985 | van der Lely |
| 4,538,688 | A | 9/1985 | Szucs |
| 4,550,122 | A | 10/1985 | David |
| 4,553,607 | A | 11/1985 | Behn |
| 4,580,506 | A | 4/1986 | Fleischer |
| 4,592,428 | A * | 6/1986 | Whitney ............... A01B 39/26 172/42 |
| 4,596,200 | A | 6/1986 | Gafford |
| 4,598,654 | A | 7/1986 | Robertson |
| 4,603,746 | A | 8/1986 | Swales |
| 4,604,906 | A | 8/1986 | Scarpa |
| 4,619,329 | A | 10/1986 | Gorbett |
| 4,630,773 | A | 12/1986 | Ortlip |
| 4,643,043 | A | 2/1987 | Furuta |
| 4,646,620 | A | 3/1987 | Buchl |
| 4,646,850 | A | 3/1987 | Brown |
| 4,648,466 | A | 3/1987 | Baker |
| 4,650,005 | A | 3/1987 | Tebben |
| 4,669,550 | A | 6/1987 | Sittre |
| 4,671,193 | A | 6/1987 | States |
| 4,674,578 | A | 6/1987 | Bexten |
| 4,682,550 | A | 7/1987 | Joy |
| 4,703,809 | A | 11/1987 | Van den Ende |
| 4,726,304 | A | 2/1988 | Dreyer |
| RE32,644 | E | 4/1988 | Brundage |
| 4,738,461 | A | 4/1988 | Stephenson |
| 4,744,316 | A | 5/1988 | Lienemann |
| 4,762,075 | A | 8/1988 | Halford |
| 4,765,190 | A | 8/1988 | Strubbe |
| 4,768,387 | A | 9/1988 | Kemp |
| 4,776,404 | A | 10/1988 | Rogers |
| 4,779,684 | A | 10/1988 | Schultz |
| 4,785,890 | A | 11/1988 | Martin |
| 4,819,738 | A | 4/1989 | Fountain |
| 4,825,957 | A | 5/1989 | White |
| 4,825,959 | A | 5/1989 | Wilhelm |
| 4,919,211 | A | 4/1990 | Cope |
| 4,920,901 | A | 5/1990 | Pounds |
| 4,926,622 | A | 5/1990 | McKee |
| 4,926,767 | A | 5/1990 | Thomas |
| 4,930,431 | A | 6/1990 | Alexander |
| 4,986,367 | A | 1/1991 | Kinzenbaw |
| 4,987,841 | A | 1/1991 | Rawson |
| 4,998,488 | A | 3/1991 | Hansson |
| 5,015,997 | A | 5/1991 | Strubbe |
| 5,022,333 | A | 6/1991 | McClure |
| 5,027,525 | A | 7/1991 | Haukaas |
| 5,033,397 | A | 7/1991 | Colburn, Jr. |
| 5,065,632 | A | 11/1991 | Reuter |
| 5,074,227 | A | 12/1991 | Schwitters |
| 5,076,180 | A | 12/1991 | Schneider |
| 5,092,255 | A | 3/1992 | Long |
| 5,113,957 | A | 5/1992 | Tamai |
| 5,129,282 | A | 7/1992 | Bassett |
| 5,136,934 | A | 8/1992 | Darby, Jr. |
| 5,190,112 | A | 3/1993 | Johnston |
| 5,220,773 | A * | 6/1993 | Klaeger ............... A01D 34/866 56/10.4 |
| 5,224,553 | A | 7/1993 | Heintzman |
| 5,234,060 | A | 8/1993 | Carter |
| 5,240,080 | A | 8/1993 | Bassett |
| 5,255,617 | A | 10/1993 | Williams |
| 5,269,237 | A | 12/1993 | Baker |
| 5,282,389 | A | 2/1994 | Faivre |
| 5,285,854 | A | 2/1994 | Thacker |
| 5,333,694 | A | 8/1994 | Roggenbuck |
| 5,337,832 | A | 8/1994 | Bassett |
| 5,341,754 | A | 8/1994 | Winterton |
| 5,346,019 | A | 9/1994 | Kinzenbaw |
| 5,346,020 | A | 9/1994 | Bassett |
| 5,349,911 | A | 9/1994 | Hoist |
| 5,351,635 | A | 10/1994 | Hulicsko |
| 5,379,847 | A | 1/1995 | Snyder |
| 5,394,946 | A | 3/1995 | Clifton |
| 5,398,771 | A | 3/1995 | Hornung |
| 5,419,402 | A | 5/1995 | Heintzman |
| 5,427,192 | A | 6/1995 | Stephenson |
| 5,443,023 | A | 8/1995 | Carroll |
| 5,443,125 | A | 8/1995 | Clark |
| 5,461,995 | A | 10/1995 | Winterton |
| 5,462,124 | A | 10/1995 | Rawson |
| 5,473,999 | A | 12/1995 | Rawson |
| 5,474,135 | A | 12/1995 | Schlagel |
| 5,477,682 | A | 12/1995 | Tobiasz |
| 5,477,792 | A | 12/1995 | Bassett |
| 5,479,868 | A | 1/1996 | Bassett |
| 5,479,992 | A | 1/1996 | Bassett |
| 5,485,796 | A | 1/1996 | Bassett |
| 5,485,886 | A | 1/1996 | Bassett |
| 5,497,717 | A | 3/1996 | Martin |
| 5,497,837 | A | 3/1996 | Kehrney |
| 5,499,042 | A | 3/1996 | Yanagawa |
| 5,499,683 | A | 3/1996 | Bassett |
| 5,499,685 | A | 3/1996 | Downing, Jr. |
| 5,517,932 | A | 5/1996 | Ott |
| 5,524,525 | A | 6/1996 | Nikkei |
| 5,531,171 | A | 7/1996 | Whitesel |
| 5,542,362 | A | 8/1996 | Bassett |
| 5,544,709 | A | 8/1996 | Lowe |
| 5,562,165 | A | 10/1996 | Janelle |
| 5,590,611 | A | 1/1997 | Smith |
| 5,603,269 | A | 2/1997 | Bassett |
| 5,623,997 | A | 4/1997 | Rawson |
| 5,640,914 | A | 6/1997 | Rawson |
| 5,657,707 | A | 8/1997 | Dresher |

(56) References Cited

U.S. PATENT DOCUMENTS

| | | |
|---|---|---|
| 5,660,126 A | 8/1997 | Freed |
| 5,685,245 A | 11/1997 | Bassett |
| 5,704,430 A | 1/1998 | Smith |
| 5,709,271 A | 1/1998 | Bassett |
| 5,725,057 A | 3/1998 | Taylor |
| 5,727,638 A | 3/1998 | Wodrich |
| 5,730,074 A | 3/1998 | Peter |
| 5,809,757 A | 9/1998 | McLean |
| 5,833,011 A | 11/1998 | Boertlein |
| 5,852,982 A | 12/1998 | Peter |
| 5,868,207 A | 2/1999 | Langbakk |
| 5,878,678 A | 3/1999 | Stephens |
| RE36,243 E | 7/1999 | Rawson |
| 5,953,895 A | 9/1999 | Hobbs |
| 5,970,891 A | 10/1999 | Schlagel |
| 5,970,892 A | 10/1999 | Wendling |
| 5,988,293 A | 11/1999 | Brueggen |
| 6,067,918 A | 5/2000 | Kirby |
| 6,068,061 A | 5/2000 | Smith |
| 6,079,340 A | 6/2000 | Flamme |
| 6,082,274 A | 7/2000 | Peter |
| 6,085,501 A | 7/2000 | Walch |
| 6,091,997 A | 7/2000 | Flamme |
| 6,145,288 A | 11/2000 | Tamian |
| 6,164,385 A | 12/2000 | Buchl |
| 6,176,334 B1 | 1/2001 | Lorenzen |
| 6,223,663 B1 | 5/2001 | Wendling |
| 6,223,828 B1 | 5/2001 | Paulson |
| 6,237,696 B1 | 5/2001 | Mayerle |
| 6,253,692 B1 | 7/2001 | Wendling |
| 6,289,829 B1 | 9/2001 | Fish |
| 6,295,939 B1 | 10/2001 | Emms |
| 6,314,897 B1 | 11/2001 | Hagny |
| 6,325,156 B1 | 12/2001 | Barry |
| 6,330,922 B1 | 12/2001 | King |
| 6,331,142 B1 | 12/2001 | Bischoff |
| 6,343,661 B1 | 2/2002 | Thomspon |
| 6,347,594 B1 | 2/2002 | Wendling |
| 6,382,326 B1 | 5/2002 | Goins |
| 6,389,999 B1 | 5/2002 | Duello |
| 6,453,832 B1 | 9/2002 | Schaffert |
| 6,454,019 B1 | 9/2002 | Prairie |
| 6,460,623 B1 | 10/2002 | Knussman |
| 6,497,088 B1 | 12/2002 | Holley |
| 6,516,595 B2 | 2/2003 | Rhody |
| 6,526,735 B2 | 3/2003 | Meyer |
| 6,530,334 B2 | 3/2003 | Hagny |
| 6,575,104 B2 | 6/2003 | Brummelhuis |
| 6,622,468 B2 | 9/2003 | Lucand |
| 6,644,224 B1 | 11/2003 | Bassett |
| 6,681,868 B2 | 1/2004 | Kovach |
| 6,701,856 B1 | 3/2004 | Zoke |
| 6,701,857 B1 | 3/2004 | Jensen |
| 6,715,433 B1 | 4/2004 | Friestad |
| 6,763,773 B2 | 7/2004 | Schaffert |
| 6,786,130 B2 | 9/2004 | Steinlage |
| 6,827,029 B1 | 12/2004 | Wendte |
| 6,834,598 B2 | 12/2004 | Jüptner |
| 6,840,853 B2 | 1/2005 | Foth |
| 6,843,047 B2 | 1/2005 | Hurtis |
| 6,853,937 B2 | 2/2005 | Shibusawa |
| 6,886,650 B2 | 5/2005 | Bremmer |
| 6,889,943 B2 | 5/2005 | Dinh |
| 6,892,656 B2 | 5/2005 | Schneider |
| 6,907,833 B2 | 6/2005 | Thompson |
| 6,908,052 B1 | 6/2005 | Jacobson |
| 6,912,963 B2 | 7/2005 | Bassett |
| 6,923,390 B1 | 8/2005 | Barker |
| 6,968,907 B1 | 11/2005 | Raper |
| 6,986,313 B2 | 1/2006 | Halford |
| 6,997,400 B1 | 2/2006 | Hanna |
| 7,004,090 B2 | 2/2006 | Swanson |
| 7,044,070 B2 | 5/2006 | Kaster |
| 7,063,167 B1 | 6/2006 | Staszak |
| 7,159,523 B2 | 1/2007 | Bourgault |
| 7,163,227 B1 | 1/2007 | Burns |
| 7,222,575 B2 | 5/2007 | Bassett |
| 7,249,448 B2 | 7/2007 | Murphy |
| 7,290,491 B2 | 11/2007 | Summach |
| 7,325,756 B1 | 2/2008 | Giorgis |
| 7,347,036 B1 | 3/2008 | Easley, Jr. |
| 7,360,494 B2 | 4/2008 | Martin |
| 7,360,495 B1 | 4/2008 | Martin |
| 7,438,006 B2 | 10/2008 | Mariman |
| 7,451,712 B2 | 11/2008 | Bassett |
| 7,497,174 B2 | 3/2009 | Sauder |
| 7,523,709 B1 | 4/2009 | Kiest |
| 7,540,245 B1 | 6/2009 | Spicer |
| 7,540,333 B2 | 6/2009 | Bettin |
| 7,575,066 B2 | 8/2009 | Bauer |
| 7,584,707 B2 | 9/2009 | Sauder |
| 7,665,539 B2 | 2/2010 | Bassett |
| 7,673,570 B1 | 3/2010 | Bassett |
| 7,743,718 B2 | 6/2010 | Bassett |
| 7,870,827 B2 | 1/2011 | Bassett |
| 7,900,429 B2 | 3/2011 | Labar |
| 7,918,285 B1 | 4/2011 | Graham |
| 7,938,074 B2 | 5/2011 | Liu |
| 7,944,210 B2 | 5/2011 | Fischer |
| 7,946,231 B2 | 5/2011 | Martin |
| 7,975,629 B1 | 7/2011 | Martin |
| 8,146,519 B2 | 4/2012 | Bassett |
| 8,151,717 B2 | 4/2012 | Bassett |
| 8,171,707 B2 | 5/2012 | Kitchel |
| D663,326 S | 7/2012 | Allensworth |
| 8,327,780 B2 | 12/2012 | Bassett |
| 8,359,988 B2 | 1/2013 | Bassett |
| 8,380,356 B1 | 2/2013 | Zielke |
| 8,386,137 B2 | 2/2013 | Sauder |
| 8,393,407 B2 | 3/2013 | Freed |
| 8,408,149 B2 | 4/2013 | Rylander |
| 8,544,397 B2 | 10/2013 | Bassett |
| 8,544,398 B2 | 10/2013 | Bassett |
| 8,550,020 B2 | 10/2013 | Sauder |
| 8,573,319 B1 | 11/2013 | Casper |
| 8,634,992 B2 | 1/2014 | Sauder |
| 8,636,077 B2 | 1/2014 | Bassett |
| 8,649,930 B2 | 2/2014 | Reeve |
| 8,746,661 B2 | 6/2014 | Runkel |
| 8,763,713 B2 | 7/2014 | Bassett |
| 8,770,308 B2 | 7/2014 | Bassett |
| 8,776,702 B2 | 7/2014 | Bassett |
| RE45,091 E | 8/2014 | Bassett |
| 8,863,857 B2 | 10/2014 | Bassett |
| 8,910,581 B2 | 12/2014 | Bassett |
| 8,939,095 B2 | 1/2015 | Freed |
| 8,985,232 B2 | 3/2015 | Bassett |
| 9,003,982 B1 | 4/2015 | Elizalde |
| 9,003,983 B2 | 4/2015 | Roth |
| 9,055,712 B2 | 6/2015 | Bassett |
| 9,107,337 B2 | 8/2015 | Bassett |
| 9,107,338 B2 | 8/2015 | Bassett |
| 9,113,589 B2 | 8/2015 | Bassett |
| 9,144,187 B2 | 9/2015 | Bassett |
| 9,148,989 B2 | 10/2015 | Van Buskirk |
| 9,167,740 B2 | 10/2015 | Bassett |
| 9,192,088 B2 | 11/2015 | Bruce |
| 9,192,089 B2 | 11/2015 | Bassett |
| 9,192,091 B2 | 11/2015 | Bassett |
| 9,215,838 B2 | 12/2015 | Bassett |
| 9,215,839 B2 | 12/2015 | Bassett |
| 9,226,440 B2 | 1/2016 | Bassett |
| 9,232,687 B2 | 1/2016 | Bassett |
| 9,241,438 B2 | 1/2016 | Bassett |
| 9,271,437 B2 | 3/2016 | Martin |
| 9,307,690 B2 | 4/2016 | Bassett |
| 9,392,743 B2 | 7/2016 | Camacho-Cook |
| 9,504,198 B2 | 11/2016 | Martin |
| 9,615,497 B2 | 4/2017 | Bassett |
| 9,668,398 B2 | 6/2017 | Bassett |
| 9,681,601 B2 | 6/2017 | Bassett |
| 9,723,778 B2 | 8/2017 | Bassett |
| 9,788,472 B2 | 10/2017 | Bassett |
| 9,848,522 B2 | 12/2017 | Bassett |

(56) References Cited

U.S. PATENT DOCUMENTS

| | | | |
|---|---|---|---|
| 9,861,022 B2 | 1/2018 | Bassett | |
| 9,980,421 B1 | 5/2018 | Hammes | |
| 10,238,024 B2 | 3/2019 | Bassett | |
| 10,251,324 B2 | 4/2019 | Martin | |
| 10,251,333 B2 | 4/2019 | Bassett | |
| 10,375,891 B2* | 8/2019 | Martin | A01D 34/80 |
| 2002/0073678 A1 | 6/2002 | Lucand | |
| 2002/0162492 A1 | 11/2002 | Juptner | |
| 2003/0141086 A1 | 7/2003 | Kovach | |
| 2003/0141088 A1 | 7/2003 | Kovach | |
| 2004/0005929 A1 | 1/2004 | Piasecki | |
| 2004/0148917 A1 | 8/2004 | Eastwood | |
| 2005/0000202 A1 | 1/2005 | Scordilis | |
| 2005/0005704 A1 | 1/2005 | Adamchuck | |
| 2005/0045080 A1 | 3/2005 | Halford | |
| 2005/0199842 A1 | 9/2005 | Parsons | |
| 2006/0102058 A1 | 5/2006 | Swanson | |
| 2006/0118662 A1 | 6/2006 | Korus | |
| 2006/0191695 A1 | 8/2006 | Walker et al. | |
| 2006/0213566 A1 | 9/2006 | Johnson | |
| 2006/0237203 A1 | 10/2006 | Miskin | |
| 2007/0044694 A1 | 3/2007 | Martin | |
| 2007/0272134 A1 | 11/2007 | Baker | |
| 2008/0093093 A1 | 4/2008 | Sheppard | |
| 2008/0173220 A1 | 7/2008 | Wuertz | |
| 2008/0236461 A1 | 10/2008 | Sauder | |
| 2008/0256916 A1 | 10/2008 | Vaske | |
| 2009/0133888 A1 | 5/2009 | Kovach | |
| 2009/0260902 A1 | 10/2009 | Holman | |
| 2010/0006309 A1 | 1/2010 | Ankenman | |
| 2010/0019471 A1 | 1/2010 | Ruckle | |
| 2010/0108336 A1 | 5/2010 | Thomson | |
| 2010/0180695 A1 | 7/2010 | Sauder | |
| 2010/0198529 A1 | 8/2010 | Sauder | |
| 2010/0282480 A1 | 11/2010 | Breker | |
| 2011/0101135 A1 | 5/2011 | Korus | |
| 2011/0147148 A1 | 6/2011 | Ripa | |
| 2011/0239920 A1 | 10/2011 | Henry | |
| 2011/0247537 A1 | 10/2011 | Freed | |
| 2011/0313575 A1 | 12/2011 | Kowalchuk | |
| 2012/0010782 A1 | 1/2012 | Grabow | |
| 2012/0167809 A1 | 7/2012 | Bassett | |
| 2012/0186216 A1 | 7/2012 | Vaske | |
| 2012/0186503 A1 | 7/2012 | Sauder | |
| 2012/0216731 A1 | 8/2012 | Schilling | |
| 2012/0232691 A1 | 9/2012 | Green | |
| 2012/0255475 A1 | 10/2012 | Mariman | |
| 2013/0032363 A1 | 2/2013 | Curry | |
| 2013/0112121 A1 | 5/2013 | Achen | |
| 2013/0112124 A1 | 5/2013 | Bergen | |
| 2013/0213676 A1 | 8/2013 | Bassett | |
| 2013/0325267 A1 | 12/2013 | Adams | |
| 2013/0333599 A1 | 12/2013 | Bassett | |
| 2014/0000448 A1 | 1/2014 | Franklin, III | |
| 2014/0026748 A1 | 1/2014 | Stoller | |
| 2014/0034339 A1 | 2/2014 | Sauder | |
| 2014/0034343 A1 | 2/2014 | Sauder | |
| 2014/0034344 A1 | 2/2014 | Bassett | |
| 2014/0165527 A1 | 6/2014 | Oehler | |
| 2014/0190712 A1 | 7/2014 | Bassett | |
| 2014/0197249 A1 | 7/2014 | Roth | |
| 2014/0214284 A1 | 7/2014 | Sauder | |
| 2014/0224513 A1 | 8/2014 | Van Buskirk | |
| 2014/0224843 A1 | 8/2014 | Rollenhagen | |
| 2014/0278696 A1 | 9/2014 | Anderson | |
| 2015/0216108 A1 | 8/2015 | Roth | |
| 2016/0100517 A1 | 4/2016 | Bassett | |
| 2016/0270285 A1 | 9/2016 | Hennes | |
| 2016/0309641 A1 | 10/2016 | Taunton | |
| 2017/0094889 A1 | 4/2017 | Garner | |
| 2017/0127614 A1* | 5/2017 | Button | A01D 34/005 |
| 2017/0164548 A1 | 6/2017 | Bassett | |
| 2017/0300072 A1 | 7/2017 | Bassett | |
| 2017/0231145 A1 | 8/2017 | Bassett | |
| 2017/0303467 A1 | 10/2017 | Simmons | |
| 2017/0359940 A1 | 12/2017 | Bassett | |
| 2018/0000001 A1 | 1/2018 | Bassett | |
| 2018/0007834 A1* | 1/2018 | Martin | A01D 34/835 |
| 2018/0116098 A1 | 5/2018 | Bassett | |
| 2018/0139885 A1 | 5/2018 | Bassett | |
| 2018/0317380 A1 | 11/2018 | Bassett | |
| 2018/0317381 A1 | 11/2018 | Bassett | |
| 2019/0045703 A1 | 2/2019 | Bassett | |
| 2019/0059196 A1* | 2/2019 | Bourgault | A01B 39/18 |
| 2019/0082591 A1 | 3/2019 | Bassett | |
| 2019/0343042 A1* | 11/2019 | Button | A01D 34/835 |

FOREIGN PATENT DOCUMENTS

| | | | | |
|---|---|---|---|---|
| DE | 335464 | | 9/1921 | |
| DE | 1108971 | | 6/1961 | |
| DE | 24 02 411 | | 7/1975 | |
| DE | 38 30 141 C1 | | 2/1990 | |
| EP | 1 143 784 B1 | | 2/2007 | |
| EP | 2 196 337 B1 | | 6/2010 | |
| EP | 2 497 348 A1 | | 9/2012 | |
| EP | 3 150 045 A1 | | 4/2017 | |
| FR | 2891692 A1 * | | 4/2007 | A01D 34/835 |
| GB | 1 574 412 | | 9/1980 | |
| GB | 2 056 238 A | | 10/1982 | |
| GB | 2 160 401 A | | 12/1985 | |
| JP | 54-57726 | | 5/1979 | |
| SU | 392897 | | 8/1973 | |
| SU | 436778 | | 7/1974 | |
| SU | 611201 | | 6/1978 | |
| SU | 625648 | | 9/1978 | |
| SU | 1410884 A1 | | 7/1988 | |
| SU | 1466674 | | 3/1989 | |
| WO | WO 2001/023241 A2 | | 4/2001 | |
| WO | WO 2009/145381 A1 | | 12/2009 | |
| WO | WO 2011/161140 A1 | | 12/2011 | |
| WO | WO 2012/149367 A1 | | 1/2012 | |
| WO | WO 2012/149415 A1 | | 1/2012 | |
| WO | WO 2012/167244 A1 | | 12/2012 | |
| WO | WO 2013/025898 A1 | | 2/2013 | |
| WO | WO 2016/073964 A1 | | 5/2016 | |
| WO | WO 2016/073966 A1 | | 5/2016 | |

OTHER PUBLICATIONS

Buffalo Farm Equipment All Flex Cultivator Operator Manual, Apr. 1990 (7 pages).
Shivvers, Moisture Trac 3000 Brochure, Aug. 21, 1990 (5 pages).
The New Farm, "New Efficiencies in Nitrogen Application," Feb. 1991, p. 6 (1 page).
Hiniker Company, Flow & Acreage Continuous Tracking System Monitor Demonstration Manuel, date estimated as early as Feb. 1991 (7 pages).
Russnogle, John, "Sky Spy: Gulf War Technology Pinpoints Field and Yields," Top Producer, A Farm Journal Publication, Nov. 1991, pp. 12-14 (4 pages).
Borgelt, Steven C., "Sensor Technologies and Control Strategies for Managing Variability," University of Missouri, Apr. 14-16, 1992 (15 pages).
Buffalo Farm Equipment Catalog on Models 4600, 4630, 4640, and 4620, date estimated as early as Feb. 1992 (4 pages).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Exner, Rick, "Sustainable Agriculture: Practical Farmers of Iowa Reducing Weed Pressure in Ridge-Till," Iowa State University University Extension, http://www.extension.iastate.edu/Publications/SA2.pdf, Jul. 1992, Reviewed Jul. 2009, retrieved Nov. 2, 2012 (4 pages).
Finck, Charlene, "Listen to Your Soil," Farm Journal Article, Jan. 1993, pp. 14-15 (2 pages).

(56) References Cited

OTHER PUBLICATIONS

Acu-Grain, "*Combine Yield Monitor 99% Accurate? 'You Bet Your Bushels!!'*" date estimated as early as Feb. 1993 (2 pages).
John Deere, New 4435 Hydro Row-Crop and Small-Grain Combine, date estimated as early as Feb. 1993 (8 pages).
Vansichen, R. et al., "*Continuous Wheat Yield Measurement on a Combine*," date estimated as early as Feb. 1993 (5 pages).
Yetter 2010 Product Catalog, date estimated as early as Jan. 2010 (2 pages).
Gason, 3 Row Vineyard Mower Brochure, http://www.fatcow.com.au/c/Gason/Three-row-vineyard-mower-a-world-firt-p23696, Jul. 2010 (1 page).
Yetter Cut and Move Manual, Sep. 2010 (28 pages).
Yetter Screw Adjust Residue Manager Operator's Manual, labeled "2565-729_REV_D" and dated Sep. 2010 on p. 36, retrieved Mar. 10, 2014 from the internet, available online Jul. 13, 2011, at https://web.archive.org/web/20110713162510/http://www.yetterco.com/help/manuals/Screw_Adjust_Residue_ Manager2.pdf.
John Deere, Seat Catalog, date estimated as early Sep. 2011 (19 pages).
Martin Industries, LLC Paired 13 Spading Closing Wheels Brochure, date estimated as early as Jun. 6, 2012, pp. 18-25 (8 pages).
Vogt, Willie, "*Revisiting Robotics*," http://m.farmindustrynews.com/farm-equipment/revisiting-robotics, Dec. 19, 2013 (3 pages).
John Deere, New Semi-Active Sea Suspension, http://www.deere.com/en_US/parts/agparts/semiactiveseat.html, date estimated as early as Jan. 2014, retrieved Feb. 6, 2014 (2 pages).

\* cited by examiner

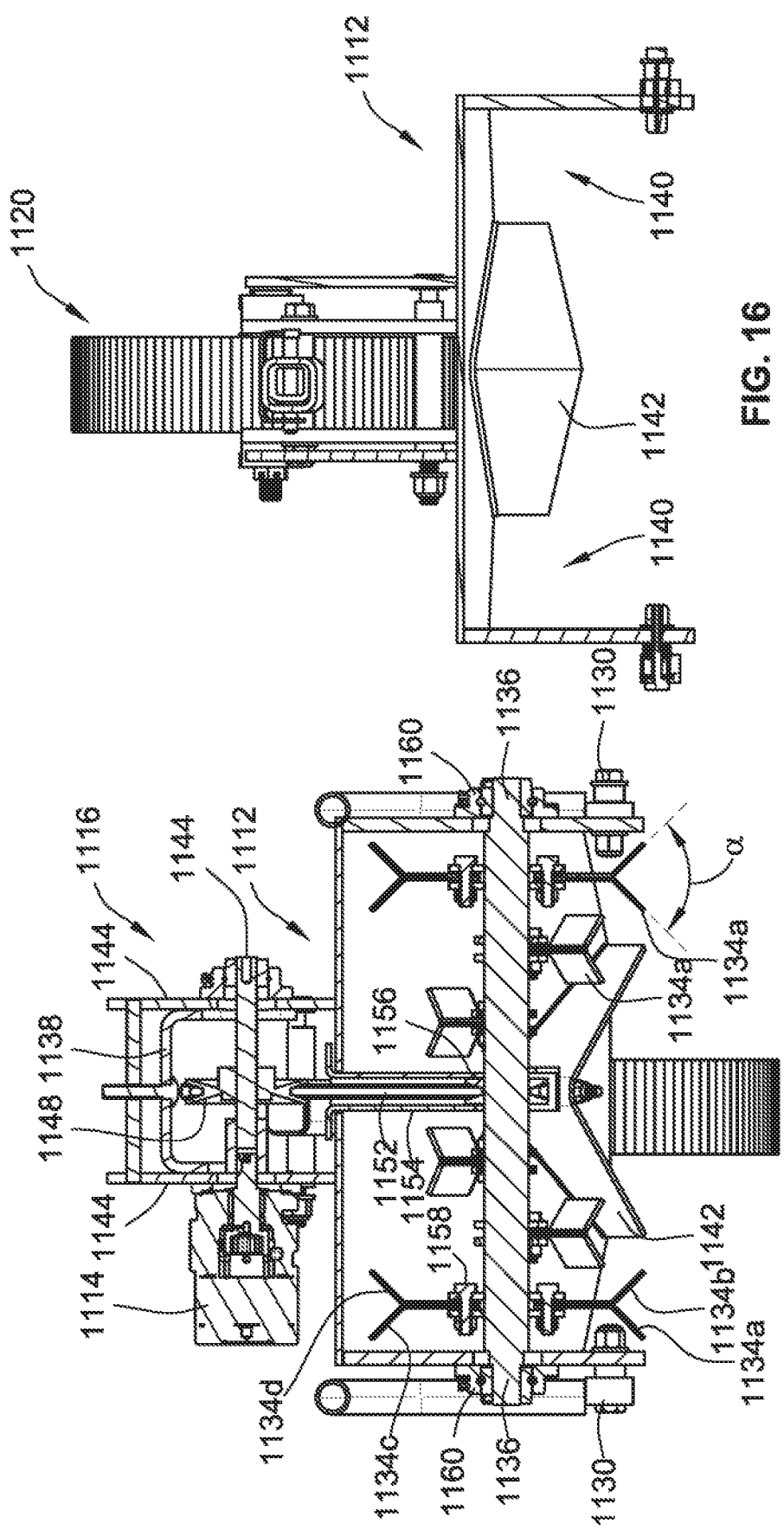

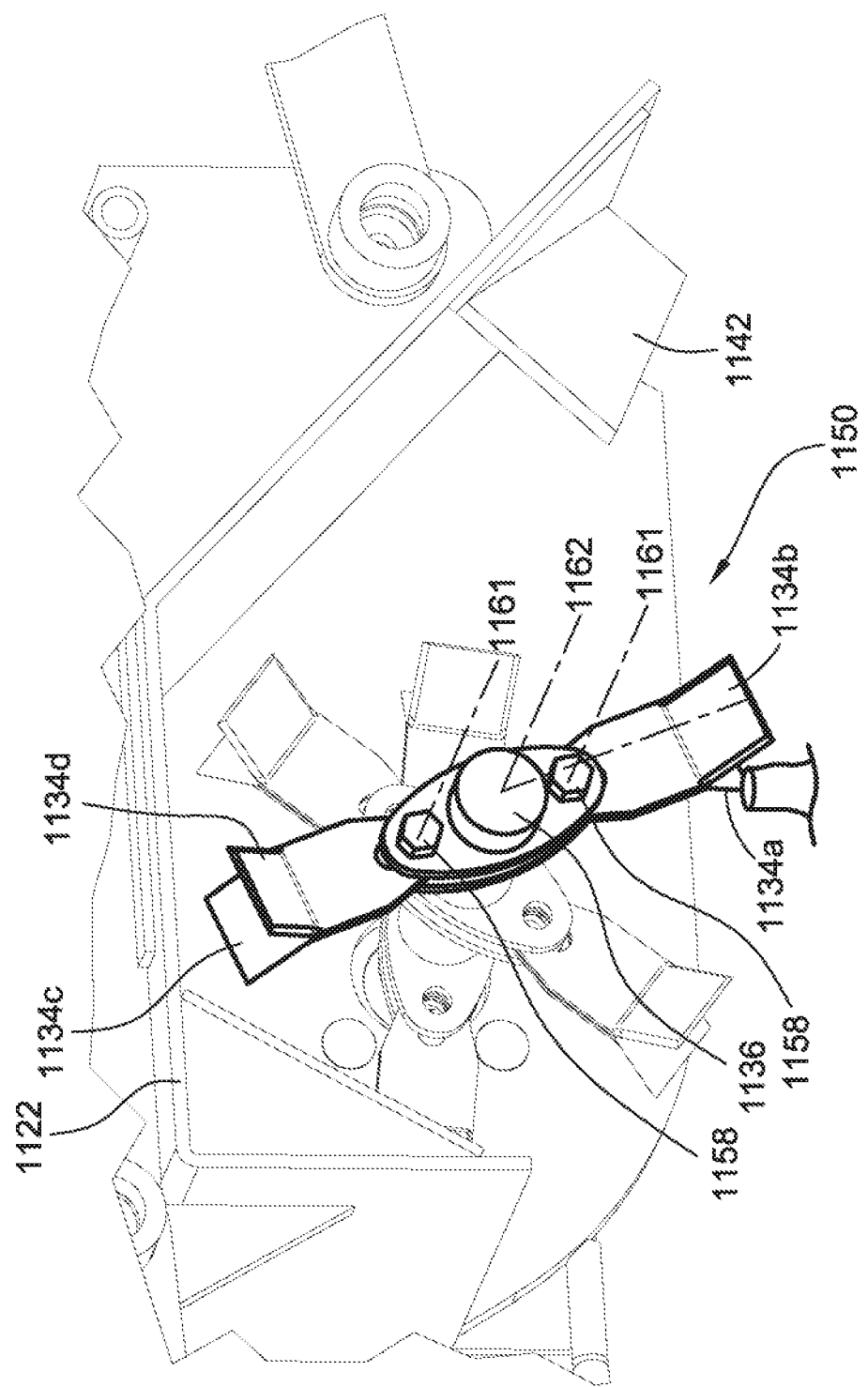

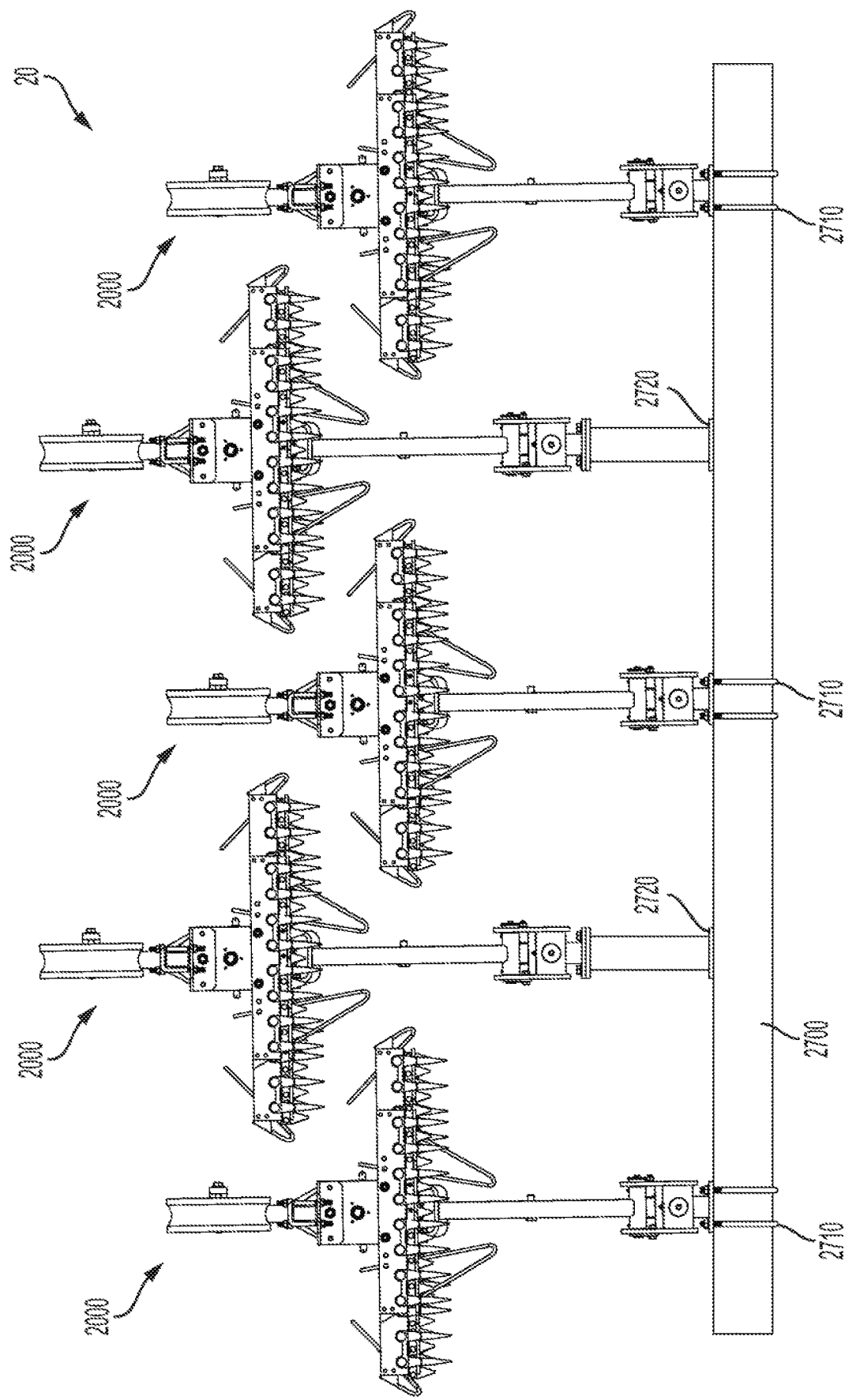

AGRICULTURAL INTER-ROW MOWING DEVICE

CROSS-REFERENCE TO RELATED APPLICATIONS

This application is a continuation-in-part of U.S. patent application Ser. No. 15/941,613, titled "Agricultural Mowing Device," filed on Mar. 30, 2018, which is a continuation-in-part of U.S. patent application Ser. No. 15/392,731, titled "Agricultural Organic Device for Weed Control," filed on Dec. 28, 2016, which in turn claims priority to U.S. Provisional Patent Application No. 62/271,770 titled "Agricultural Organic Device For Weed Control," filed on Dec. 28, 2015, which are incorporated herein by reference in their respective entireties.

FIELD OF THE INVENTION

The present invention relates generally to agricultural equipment and, more particularly, to a mowing device with an inter-row cutting unit for mowing between adjacent crop rows in a field containing a planted crop.

SUMMARY OF THE INVENTION

According to some implementations of the present disclosure, a mowing device attaches to a tractor to allow mowing between rows of planted crops, such as corn or soybeans, in an agricultural field, and optionally delivering weed-control and other substances.

According to some implementations of the present disclosure, an agricultural mowing device for controlling plants in a planted field includes a shaft, a first cutting device, and a second cutting device. The shaft has an upper section, a middle section, and a lower section. The shaft is advanced in a field between two adjacent rows of planted matter. The first cutting device is mounted to the lower section of the shaft. The first cutting device extends laterally from the shaft to a distance covering only a distance between the two adjacent rows. The first cutting device cuts plant matter that grows between the two adjacent rows. The second cutting device is mounted to the middle section of the shaft. The second cutting device extends laterally from the shaft to a distance covering at least a portion of at least one of the two adjacent rows. The second cutting device cuts plant matter that grows in the at least one of the two adjacent rows.

According to some implementations of the present disclosure, an agricultural system includes a mounting frame for attachment to an agricultural vehicle and a plurality of agricultural mowing devices for controlling plants in a planted field. At least one of the agricultural mowing devices is positionable between two adjacent rows of planted matter. The at least one of the agricultural mowing devices includes a shaft, a first cutting device, a second cutting device, and a mounting assembly. The shaft has an upper section, a middle section, and a lower section. The first cutting device is mounted to the lower section of the shaft and extending laterally from the shaft to a first distance covering only the space between the two adjacent rows. The second cutting device is mounted to the middle section of the shaft and extending laterally from the shaft to a distance covering at least a portion of at least one of the two adjacent rows. The mounting assembly is mounted to the upper section of the shaft for attachment to the mounting frame.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The invention may best be understood by reference to the following description taken in conjunction with the accompanying drawings.

FIG. 15 is an enlarged section taken along line 15-15 in FIG. 12.

FIG. 16 is an enlarged section taken along line 16-16 in FIG. 12 with the mowing device turned upside down.

FIG. 19A is an enlarged perspective view illustrating two pairs of mowing blades in the agricultural mowing device shown in FIG. 10.

FIG. 29 is a bottom view illustrating the agricultural mowing system shown in FIG. 27.

Figure 2:
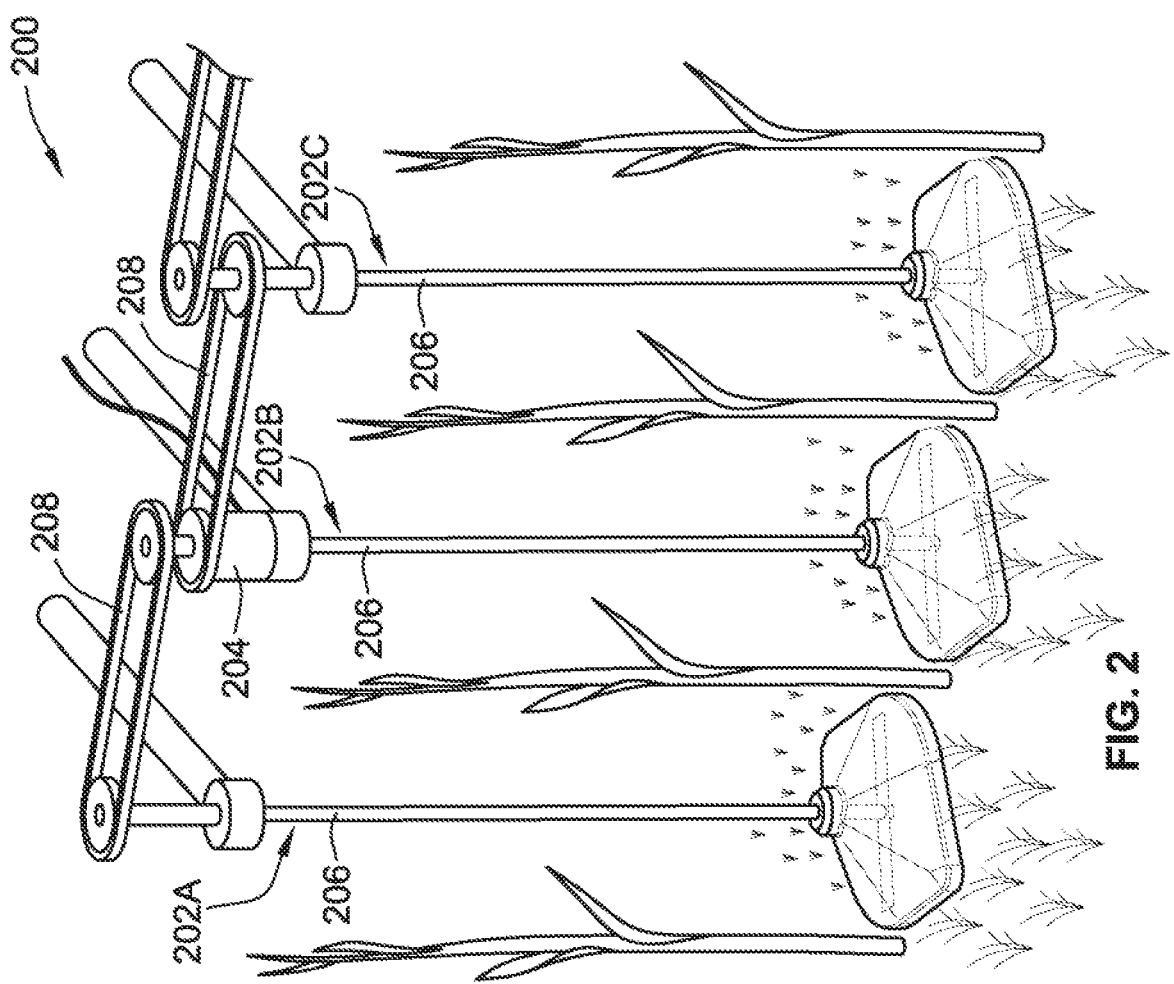
FIG. 2 is a perspective view illustrating an agricultural system with multiple weed-control units driven by a single motor.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
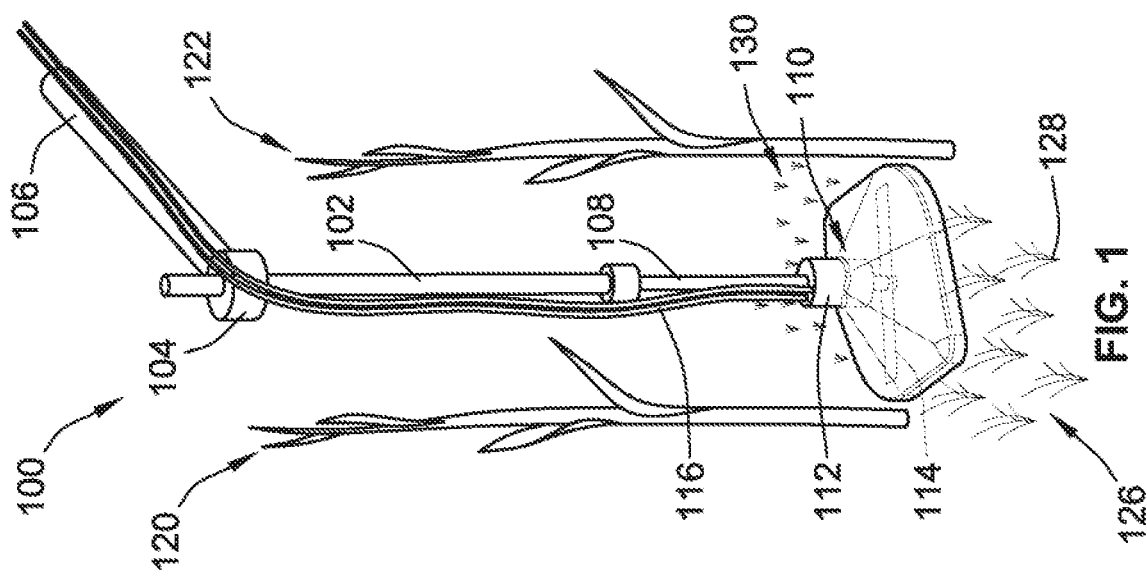
FIG. 1 is a perspective view illustrating an organic device with a single weed-control unit and a single motor.

Turning now to the drawings and referring initially to FIG. 1, an organic device 100 is attachable to an agricultural towing vehicle, e.g., a tractor, for mowing and/or spraying weeds located between rows in a field of planted matter (e.g., crops). The device 100 includes a vertically adjustable shaft 102 that is attached, at an upper end 104, to the towing vehicle via an attachment link 106 and, at a lower end 108, to a weed-control unit 110. The weed-control unit 110 includes a dedicated motor 112 and a rotatable cutting blade 114. By way of example, the motor 112 is a hydraulic or electric motor. The device 100 further includes a sprayer input with one or more sprayer input tubes 116 that are coupled to an end of the weed-control unit 110 for delivering weed-control and/or other substances.

The device 100 is advanced between adjacent rows of planted matter, such as a left row 120 and a right row 122 of plants 124 in a field 126. As the device 100 is advanced, it mows growing weeds 128 with the cutting blade 114 to clear a reduced or weed-free path 130 between the rows 120, 122. In addition to, or instead of, the mowing achieved by the cutting blade 114, the device 100 further outputs one or more weed-control substances from the sprayer input tubes 116. The weed-control substance is helpful in reducing and/or preventing the reappearance of weeds in the path 130.

Referring to FIG. 2, an agricultural system 200 includes multiple organic devices 202 driven by a single motor 204. The organic devices 202 include a left device 202A, a center device 202B, and a right device 202C, with each device having a respective shaft 206. In this example, the shaft 206 has a fixed height, with all the devices 202 having the same height.

The motor 204 is mounted to an upper end of the shaft 206 of the center device 202B. In turn, each upper end of the left and right devices 202A, 202C is coupled via a respective rotating belt or chain 208 to the center device 202B. As such, the single motor 204 drives all the devices 202 simultaneously, and is located in the center of the device so that the edges can be located as close to the planted crop as possible.

Figure 3:
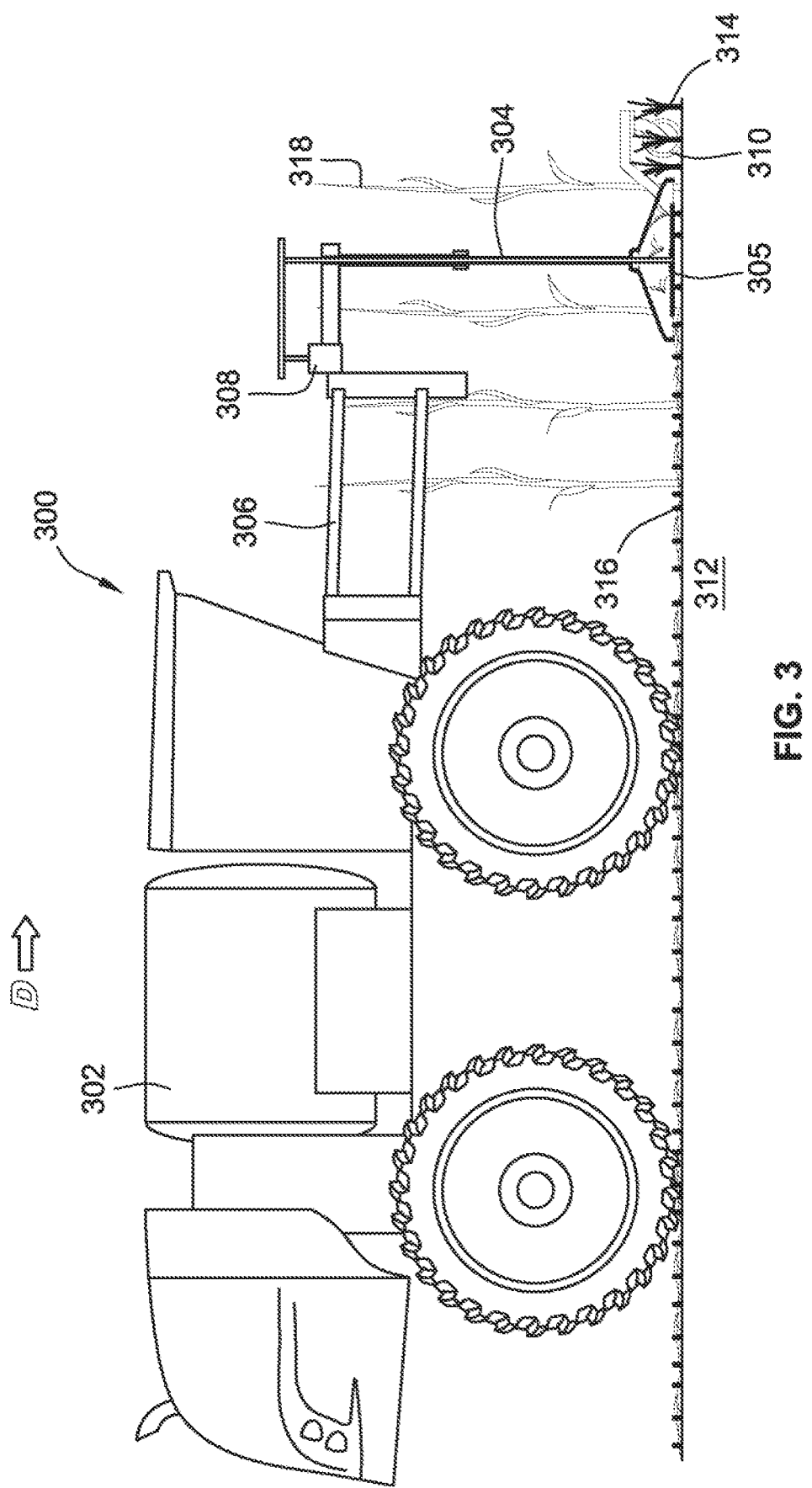
FIG. 3 is a side view illustrating an agricultural system with an agricultural vehicle attached to a weed-control unit having a single motor and a front gauge wheel.

Referring to FIG. 3, an agricultural system 300 has an agricultural vehicle 302 that is attached to an organic device 304 via a frame linkage 306. The device 304 has a weed-control unit 305, a single motor 308, and a front gauge wheel 310. As the device 304 advances in a direction D along a field 312, growing weeds 314 are mowed and/or treated with weed-control substances to achieve a generally weed-free or reduced-weed path 316 between the rows of planted matter 318.

Figure 4:
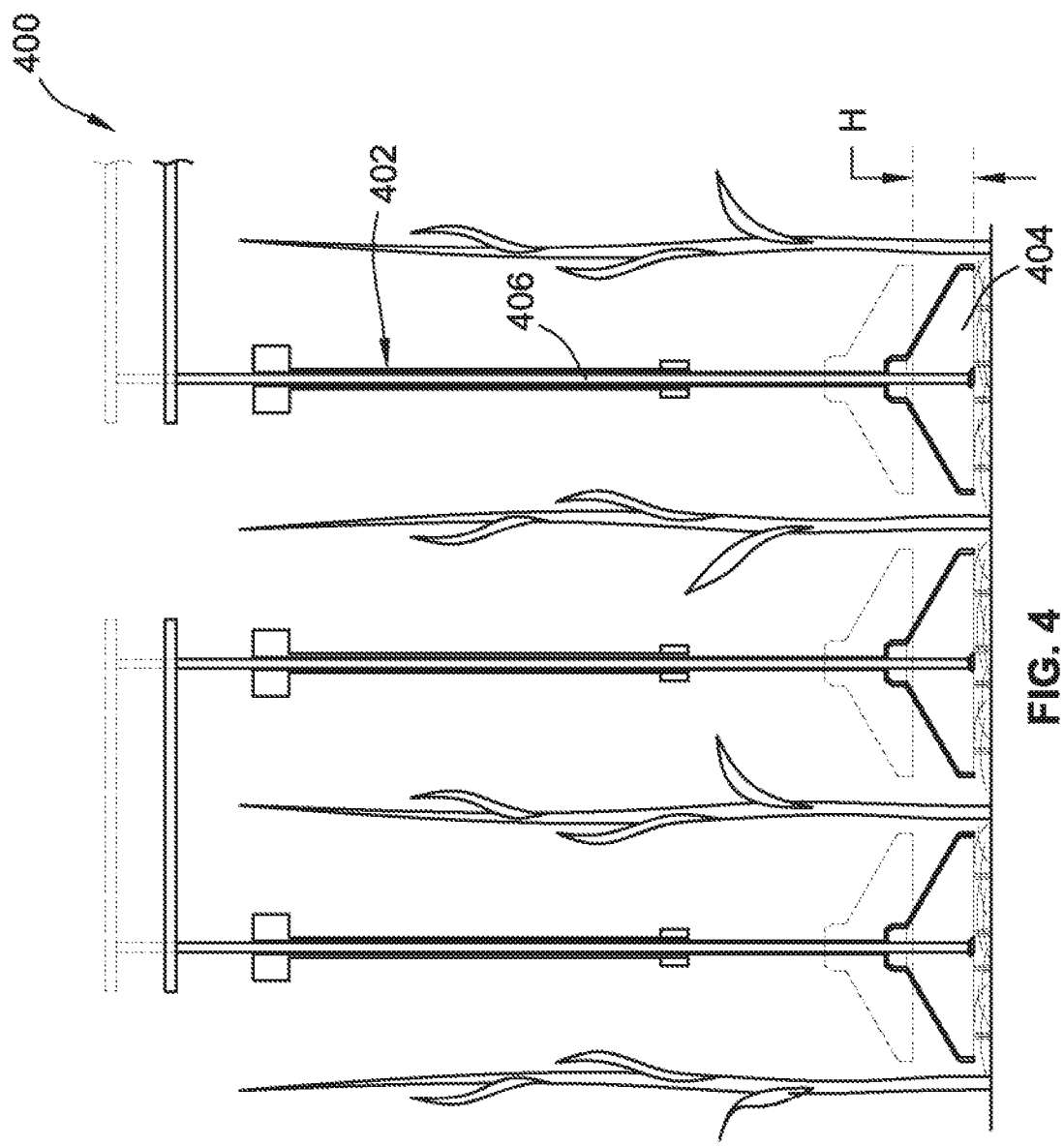
FIG. 4 is a rear view illustrating height adjustment of weed-control units.

Referring to FIG. 4, an agricultural system 400 has a plurality of organic devices 402 with respective weed-control units 404 and shafts 406. The shafts 406 are adjustable, having an H range of positions, in accordance with a weed height present in the field. As applicable, the devices 402 are generally similar (but not necessarily identical) to and include one or more components of the devices 100, 202, and 304 described above and illustrated in FIGS. 1-3.

Figure 5:
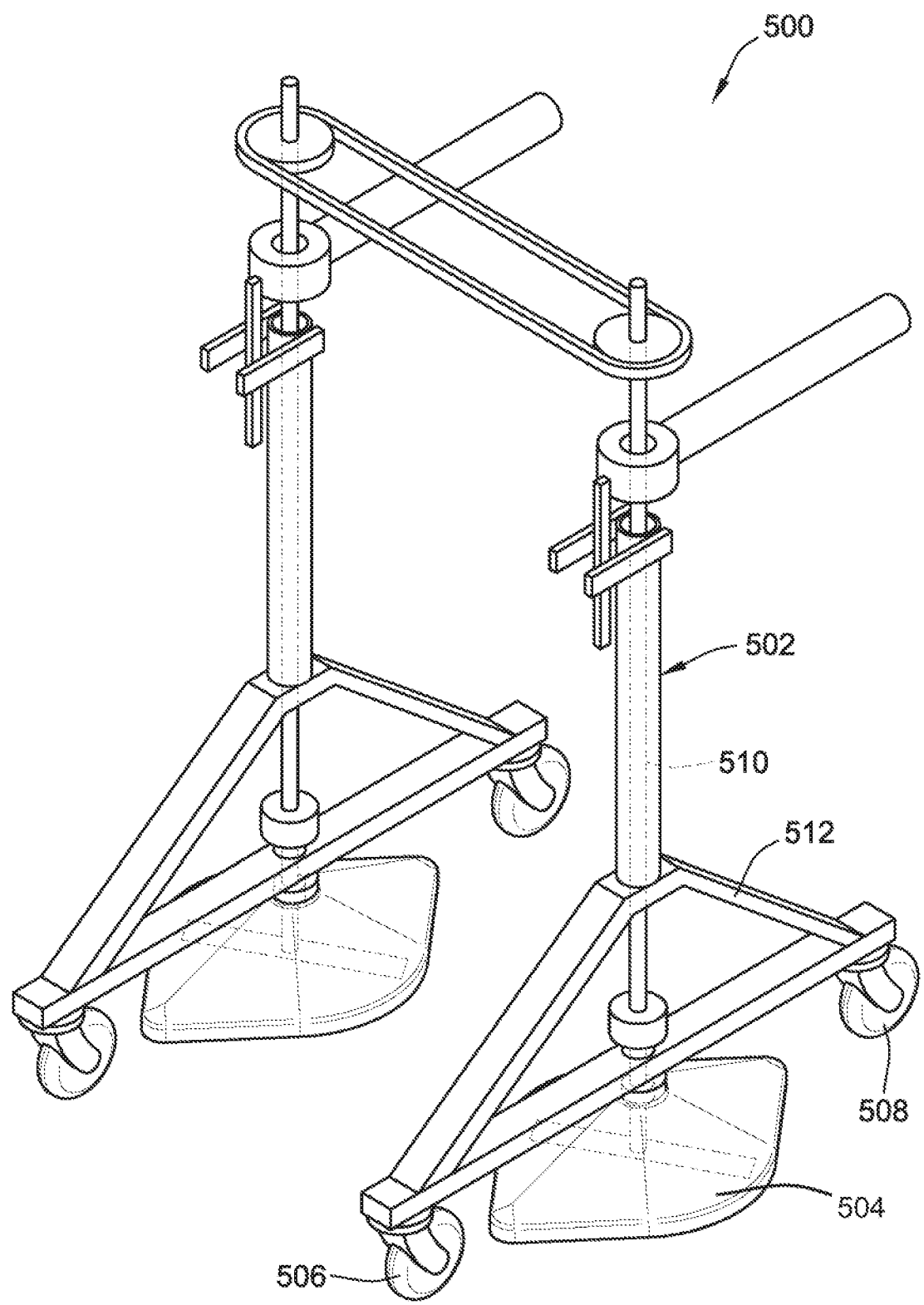
FIG. 5 is a perspective view illustrating weed-control units with front and rear gauge wheels.

Referring to FIG. 5, an agricultural system 500 has a plurality of organic devices 502 with respective weed-control units 504. Each device 502 has a pair of gauge wheels that includes a front gauge wheel 506 and a rear gauge wheel 508. The gauge wheels 506, 508 are mounted to a shaft 510 via a gauge frame 512.

Figure 6:
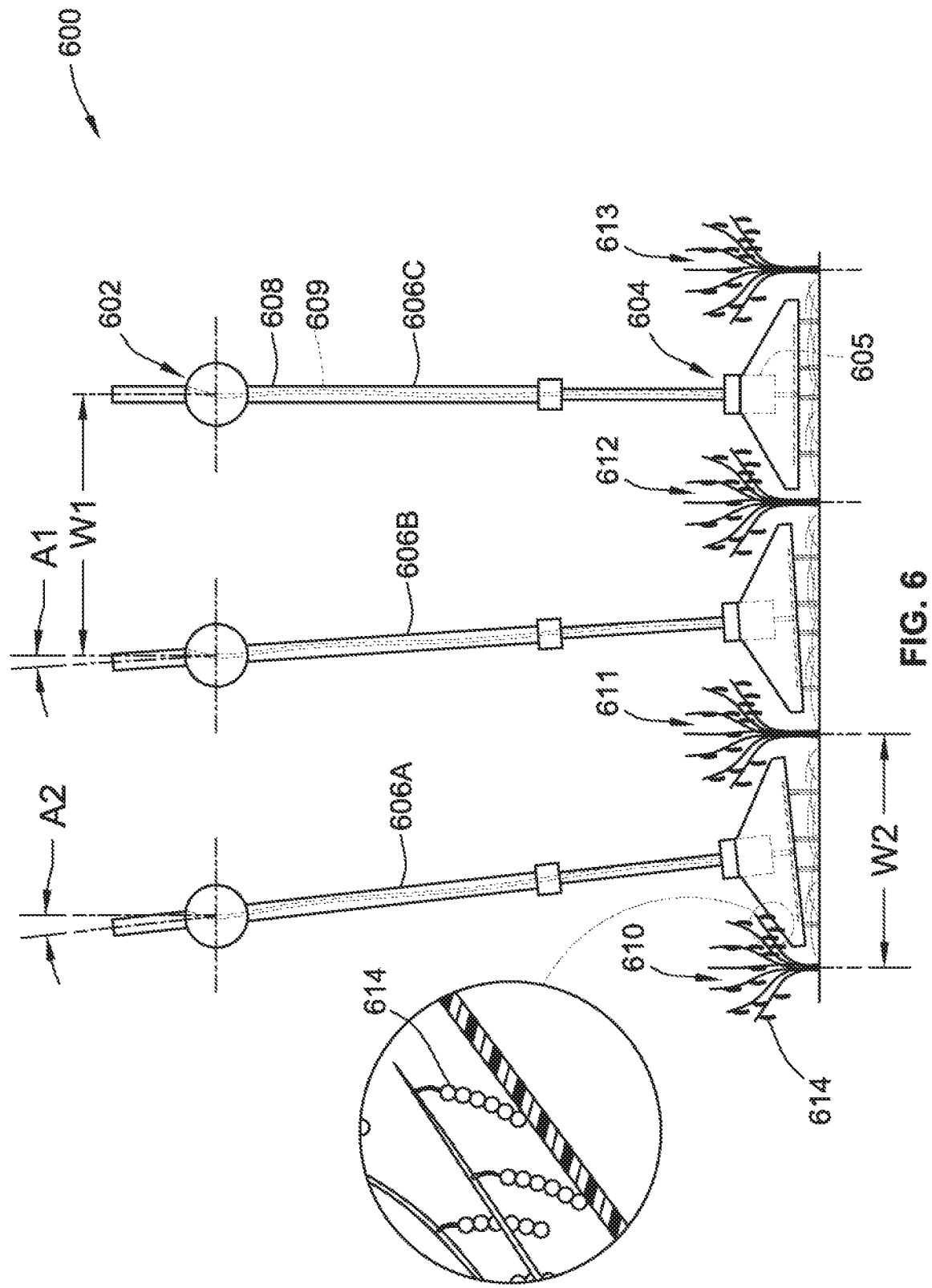
FIG. 6 is a rear view illustrating pivoting movement of weed-control units.

Referring to FIG. 6, an agricultural system 600 has a plurality of pivotable organic devices 602 with respective weed-control units 604 and motors 605. The weed-control units 604 are attached to lower ends of respective shafts 606, which include an outer protective shield 608 and an internal substance-insertion tube 609. The shafts 606 are independently pivotable at various angles, such as angles A1 and A2, with each shaft 606 pivoting between respective rows 610-613 of plants 614. For example, a left shaft 606A pivots at an angle A2 between a first row 610 and a second row 611, while a center shaft 606B simultaneously pivots at an angle A1 between the second row 611 and a third row 612.

The pivoting feature allows the devices 602 to be spaced across rows at distances that are not necessarily the same width. For example, a right shaft 606C is spaced away from the center shaft 606B at a width W1 that is greater than the space by which the left shaft 606A is spaced away from the center shaft 606B (at a smaller width W2).

Figure 7:
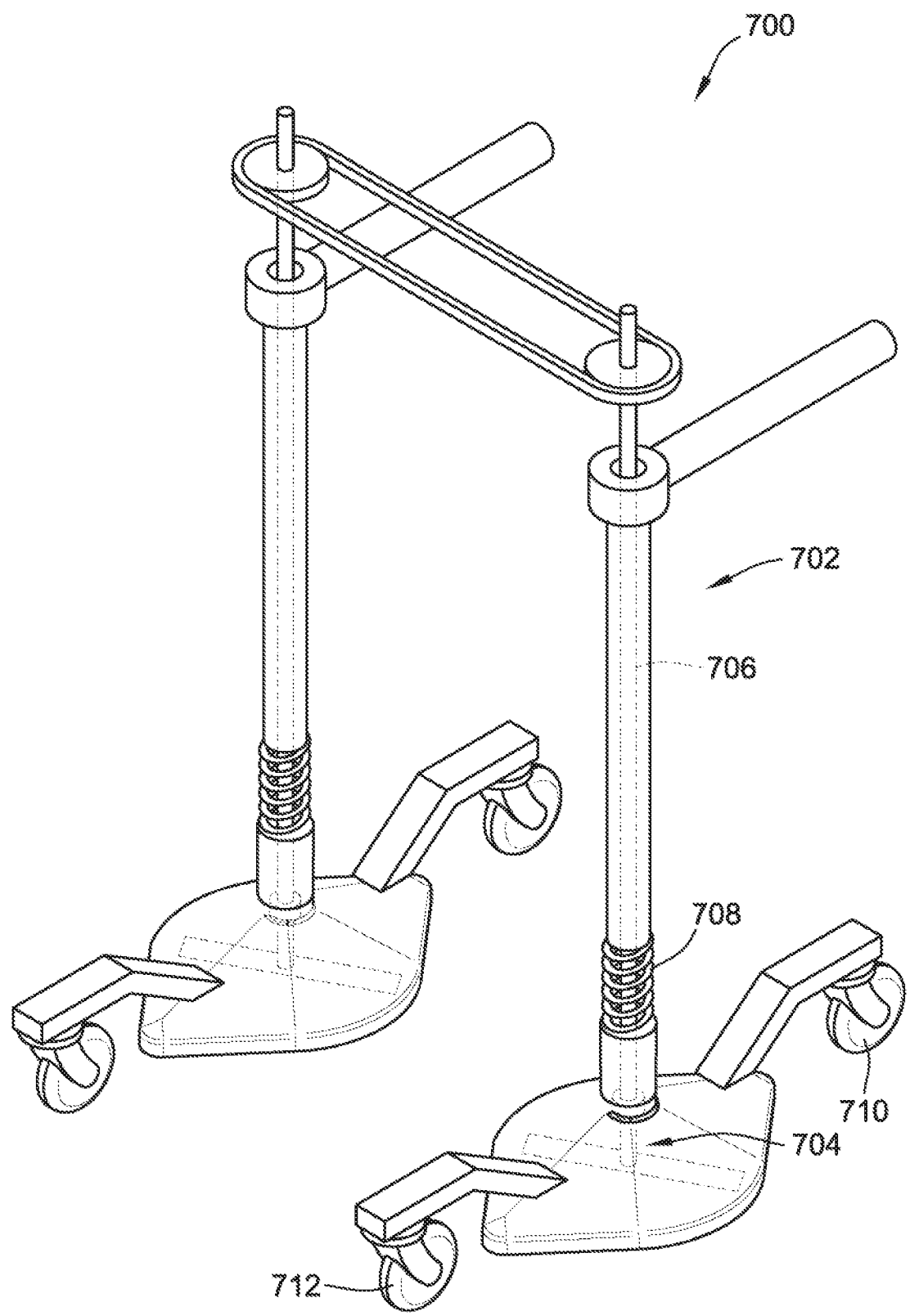
FIG. 7 is a perspective view illustrating spring-loaded weed-control units with front and rear gauge wheels.

Referring to FIG. 7, an agricultural system 700 has a plurality of organic devices 702 with respective weed-control units 704. Each organic device 702 has a shaft 706 with a spring-loaded element 708 at a lower end that is attached to the weed-control unit 704. The spring-loaded element 708 allows automatic adjustment of the weed-control unit 704 when passing over uneven terrain or weeds. The weed-control units 704 further include a pair of front and rear gauge wheels 710, 712.

Figure 8:
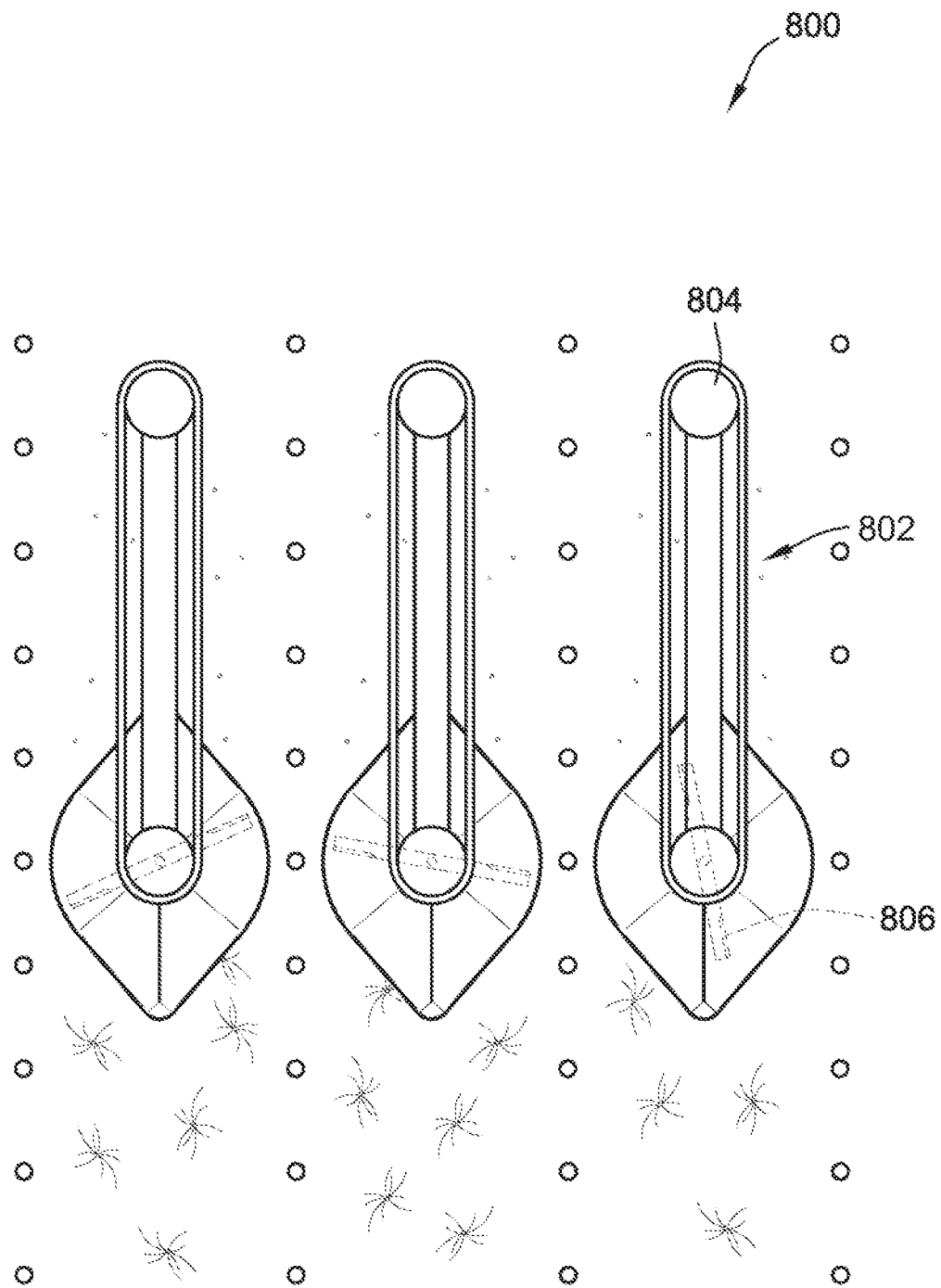
FIG. 8 is a top view illustrating single weed-control units with respective motors.

Referring to FIG. 8, an agricultural system 800 has a plurality of organic devices 802 with respective motors 804. The devices 802 have cutting blades 806 that are independently powered, respectively, by the motors 804.

Figure 9:
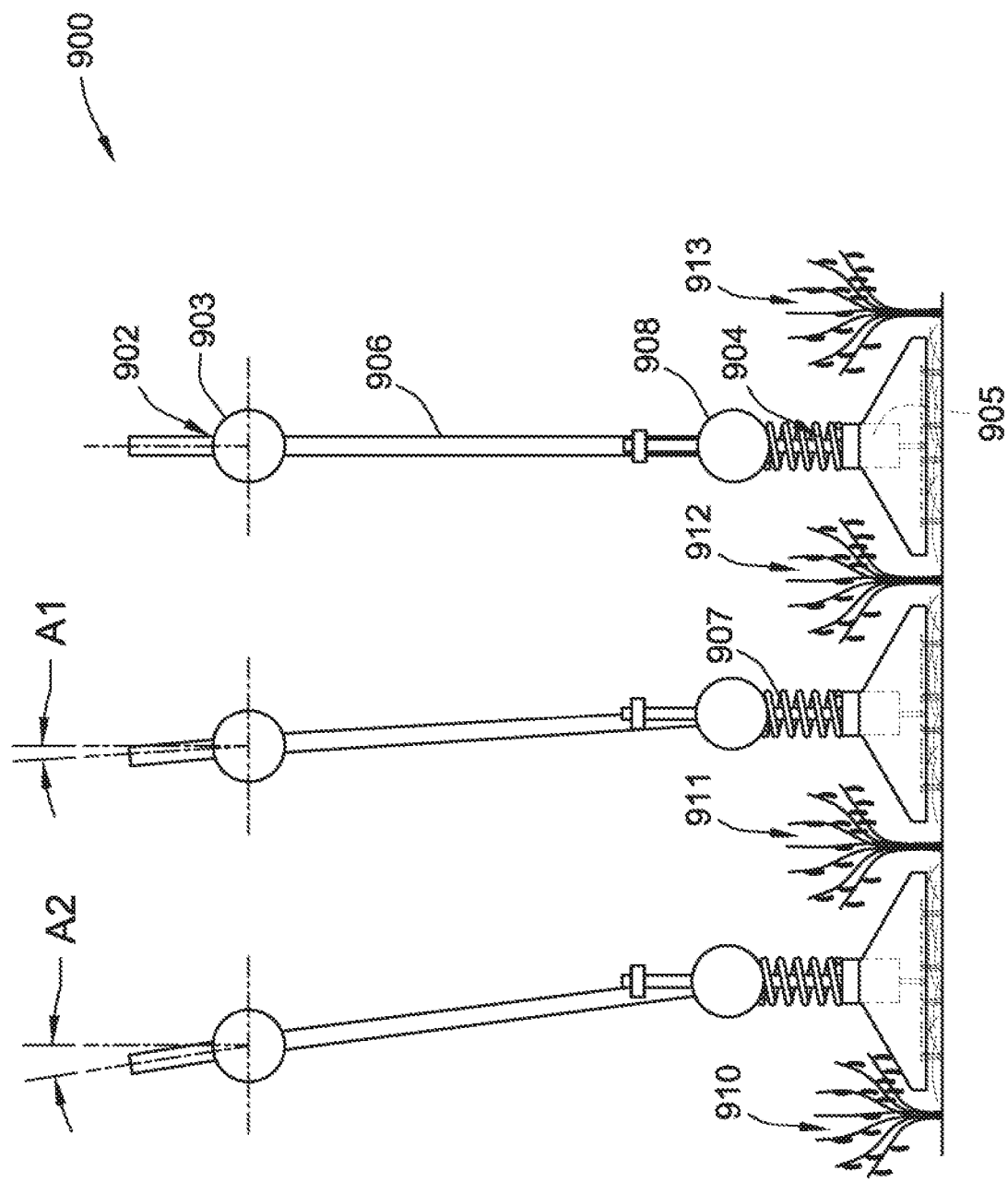
FIG. 9 is a rear view illustrating pivoting movement of weed-control units with a spring-loaded element.

Referring to FIG. 9, an agricultural system 900 has a plurality of pivotable organic devices 902 with respective weed-control units 904 and motors 905. The weed-control units 904 are attached to lower ends of respective shafts 906, which are independently pivotable at various angles (such as angles A1 and A2). A spring-loaded element 907 is mounted at the lower end of each shaft 906 to allow self-adjustment of the weed-control unit 904 over uneven terrain or weeds. As the agricultural system 900 is advanced, it mows down growing weeds 910-913 to clear reduced or weed-free paths between adjacent rows of planted matter.

The pivoting motion of the devices 902 is achieved, in part, by a top bearing element 903 and/or a bottom bearing element 908. The bottom bearing element 908, which is at a fixed distance from the top bearing element 903, allows the weed-control unit 904 to float parallel to the ground (in response to the weight of the weed-control unit 904). The height of the weed-control unit 904 is optionally maintained at a desired height via gauge wheels. Alternatively, according to another example, the height of the weed-control unit 904 is maintained via a motor drive unit mounted inside the shaft 906 or inside the bottom bearing element 908.

Figure 10:
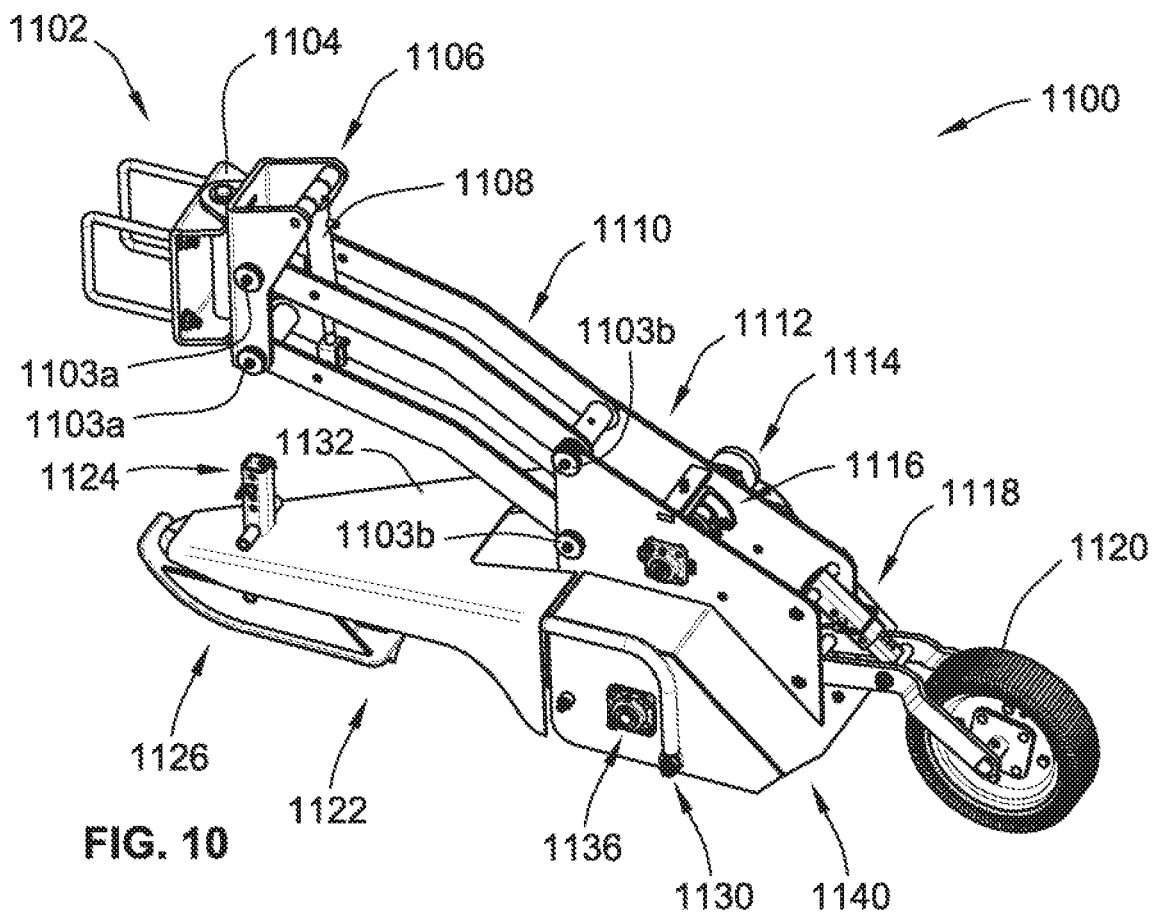
FIG. 10 is a top perspective view illustrating an agricultural mowing device.
Figure 11:
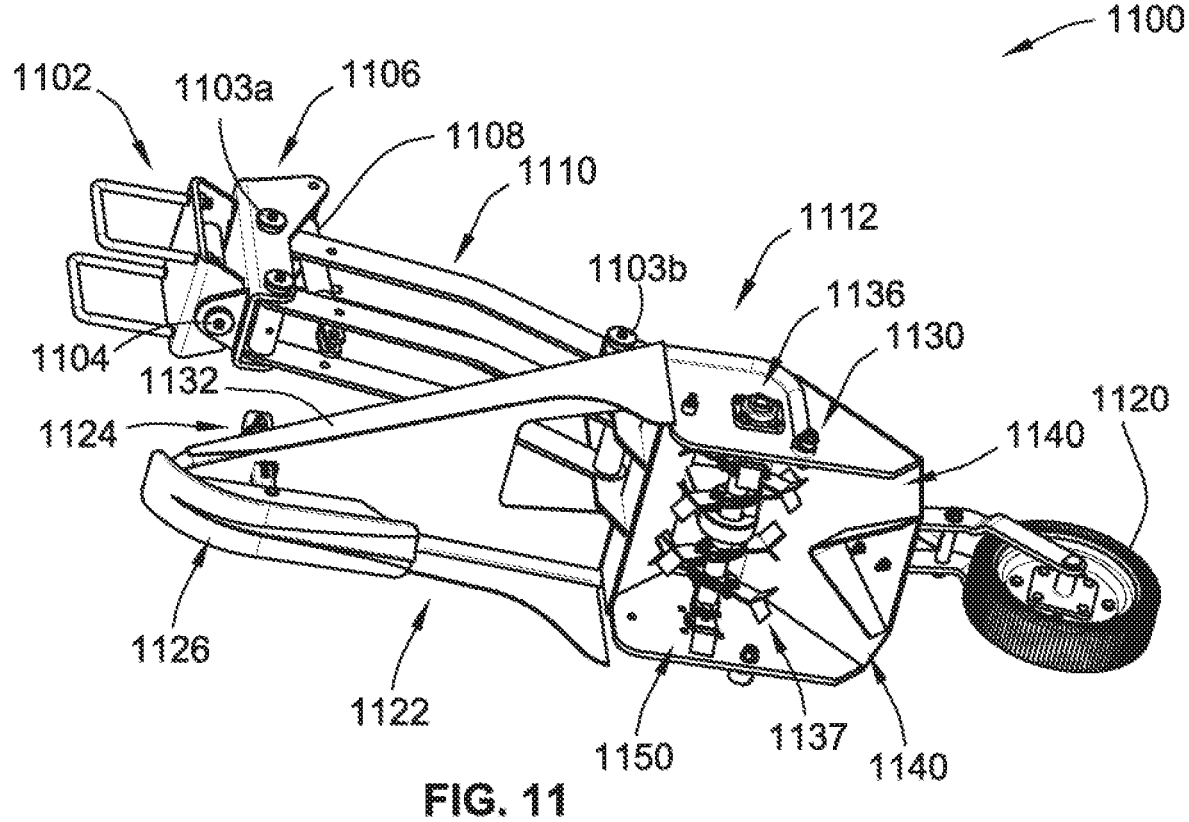
FIG. 11 is a bottom perspective view of the agricultural mowing device shown in FIG. 10.
Figure 12:
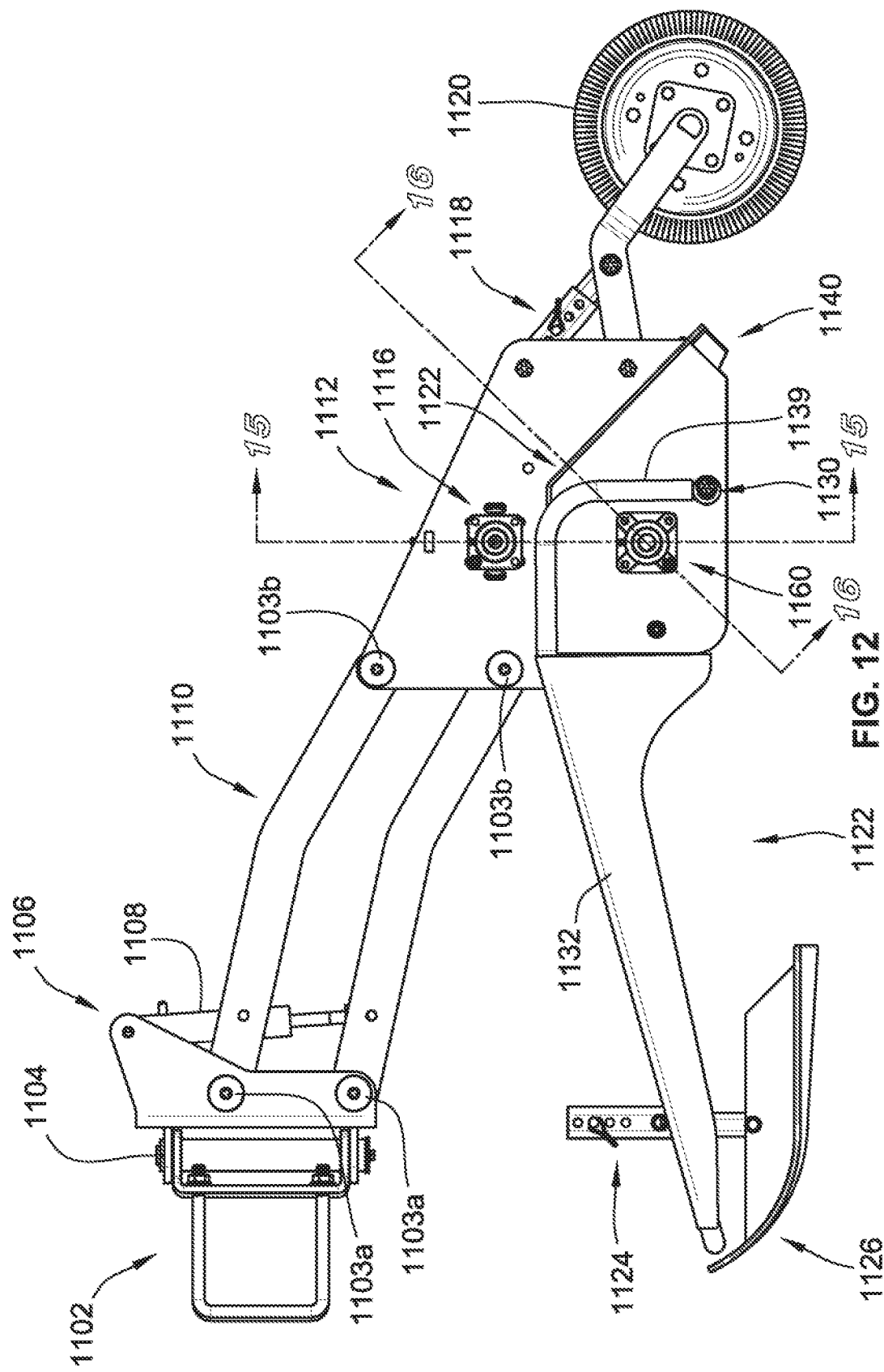
FIG. 12 is an enlarged side elevation view of the agricultural mowing device shown in FIG. 10.
Figure 13:
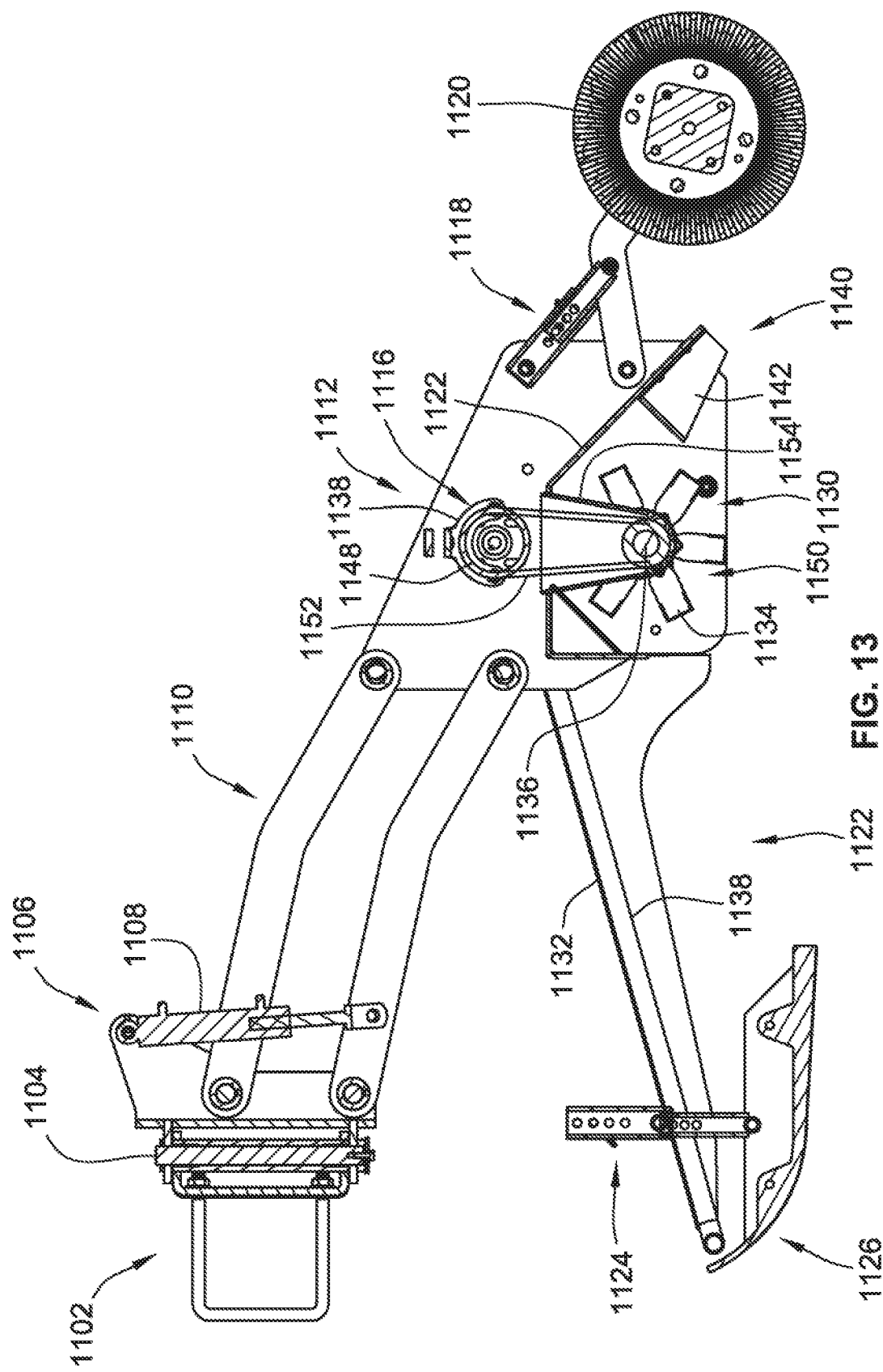
FIG. 13 is a sectional view taken along a longitudinal section taken along a longitudinal plane extending through the center of the agricultural mowing device shown in FIG. 10.
Figure 14:
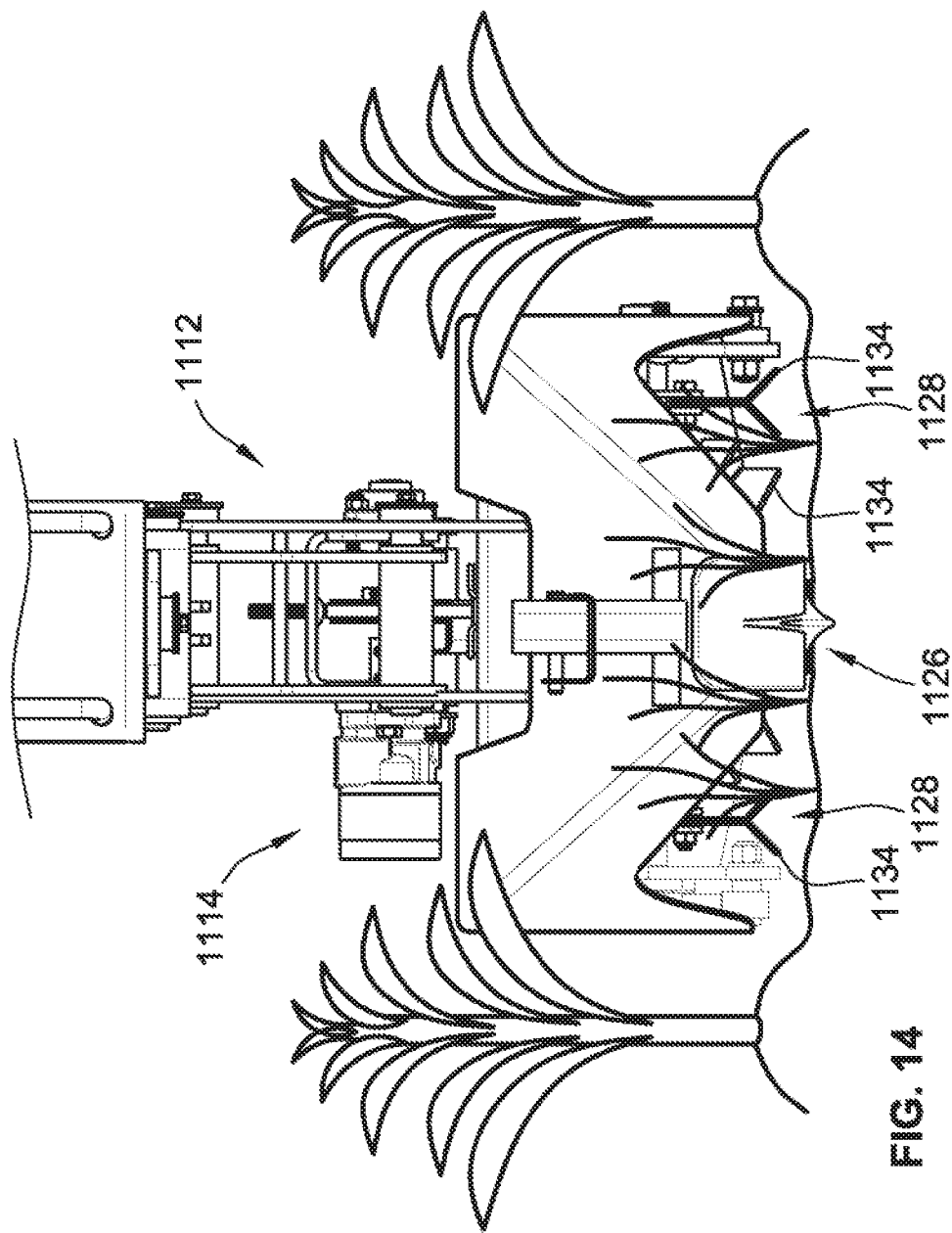
FIG. 14 is an end elevation taken from the front end of the agricultural mowing device shown in FIG. 10.

While features illustrated in FIGS. 1-9 are combinable in a single embodiment, FIGS. 10-18 illustrate a modified mowing device 1100 that includes a 4-bar linkage 1110 for attaching a cutting device 1112 to a tractor by a mounting assembly 1102. As best shown in FIGS. 10-11, a vertical pivot pin 1104 in the mounting assembly 1102 permits the 4-bar linkage 1110, and thus the cutting device, to be pivoted horizontally relative to the tractor. Two pairs of horizontal pivot pins 1103a and 1103b at opposite ends of the 4-bar linkage 1110 permit that linkage to be pivoted vertically relative to the mounting assembly 1102. A hydraulic cylinder 1108 connected between the mounting assembly 1102 and the 4-bar linkage 1110 applies a controllable down pressure on the 4-bar linkage 1110 and thus on the cutting device 1112.

Referring to FIGS. 10-14, the cutting device 1112 includes a housing that is supported between a skid 1126 on the front and a rear wheel 1120 that is able to be adjusted up and down with a height adjustment assembly 1118 that is one part of the height setting of the blade assemblies 1137. The housing contains a shaft 1136 that carries four pairs of blade assemblies 1137 for cutting off weeds or other material at a level just slightly above the ground surface, in the area between adjacent rows of a planted crop, without cutting the crop plants. The shaft 1136 that carries the blade assemblies 1137 is driven by a motor 1114 mounted on the outside surface of one of the side walls of the housing. The side walls are pivoted on the lower front ends of rods 1138 and 1139 that also support the front portion of the top wall 1132 of the housing, which is narrow enough to fit between adjacent rows of a planted crop. The pivoted mounting of the housing permits the tapered front wall of the housing to float upwardly over obstacles, and the front skid 1126 and the rear wheel 1120 enable the device 1112 to float over the surfaces of such obstacles. The tapered front end of the housing allows it to run in canopied crops.

The blade assemblies 1137 preferably include flail blades 1134 to deal with relatively heavy grass or scrub, particularly where contact with loose debris may be possible. As depicted in FIGS. 15 and 16, adjacent pairs of the flail blades 1134 in the blade assemblies 1137 are staggered with respect to each other to provide a complete cut. The flail blades 1134 are shaped like a "T" or "Y." If a flail blade strikes an immovable object, it simply bounces off.

The cutting device 1112 has a front shield 1122 with a top wall 1132 that helps guide the mower assembly in turns because the skid 1126 does not turn in reference to the main assembly 1112. The rods 1138 and 1139 that support the front shield 1122 are connected to the cutting device 1112 via pivot points 1130, which allows the shield to move up and down with the ground, and pushes the planted crop (e.g., corn, beans and other crops) away from the mower.

As best shown in FIG. 15, the flail blades 1134 are driven by a motor 1114 connected to a shaft 1144 which turns an upper pulley 1148, and a belt or chain 1152 within a shield 1154 turns a tiller blade pulley 1156 that is connected to a tiller blade shaft 1136. The motor 1114 may be a hydraulic or electric motor, or could be replaced with a PTO driveshaft or a ground drive.

This blade shaft 1136 has pivot bolts 1158 mounted on it with cutting blades 1134 that pivot around the bolts, this allows the cutting blades 1134 to hit a weed, for example, and grab the weed and move at a different speed than the shaft 1136.

Figure 17:
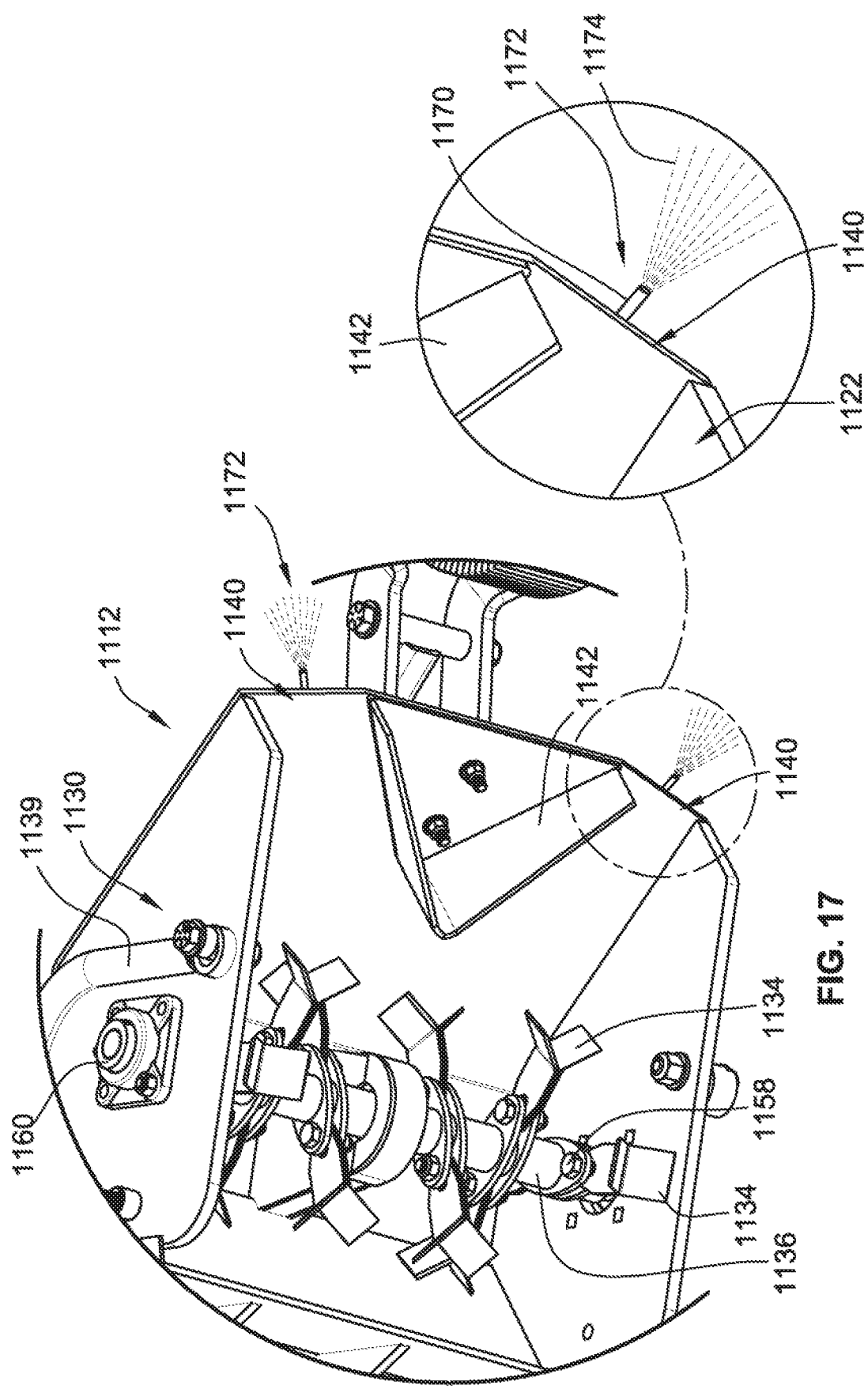
FIG. 17 is an enlarged perspective view taken from the bottom of the mowing blades in the agricultural mowing device shown in FIG. 10.
Figure 18:
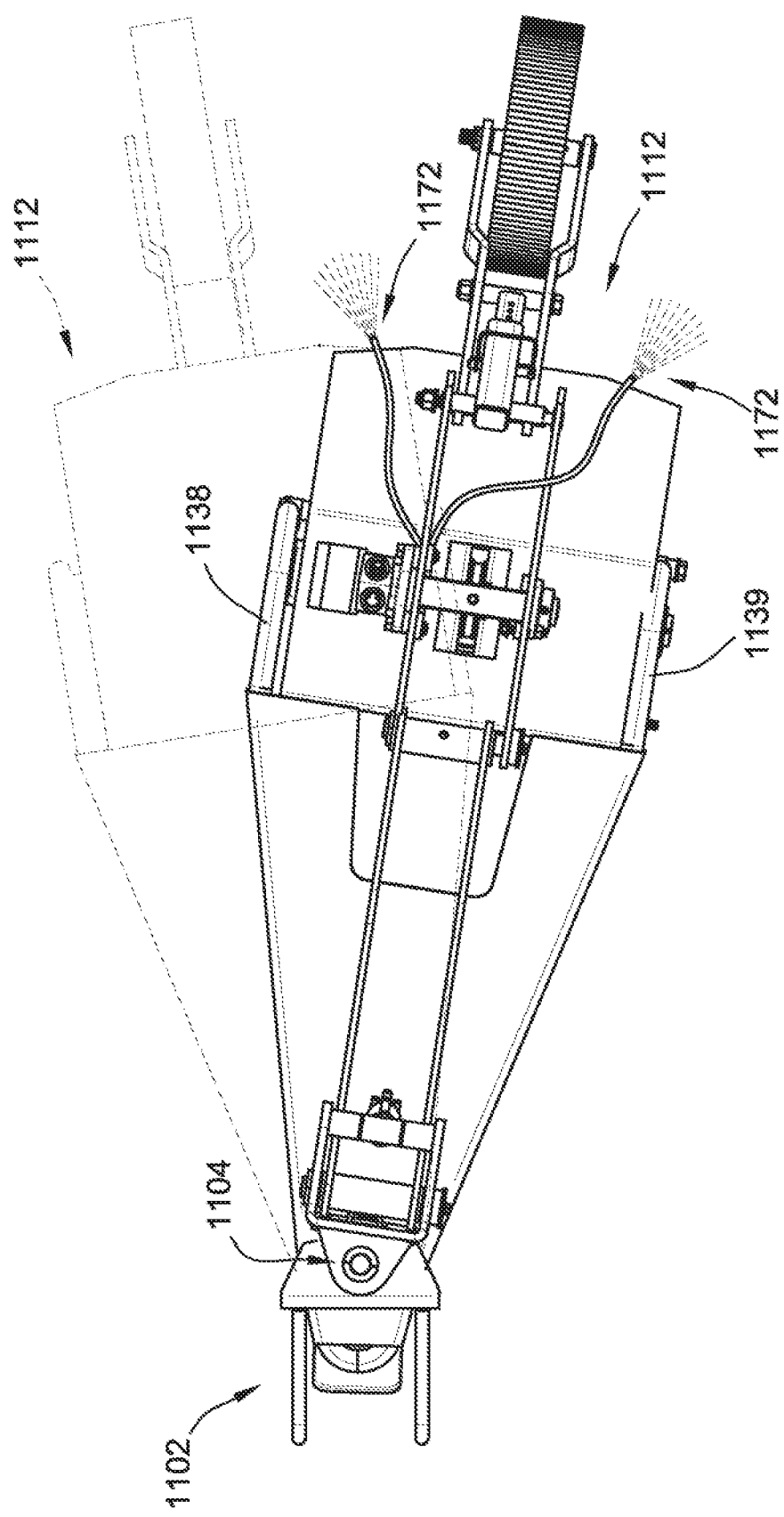
FIG. 18 is a top view of the agricultural mowing device shown in FIG. 10.
Figures 19B, 19C, 19D:
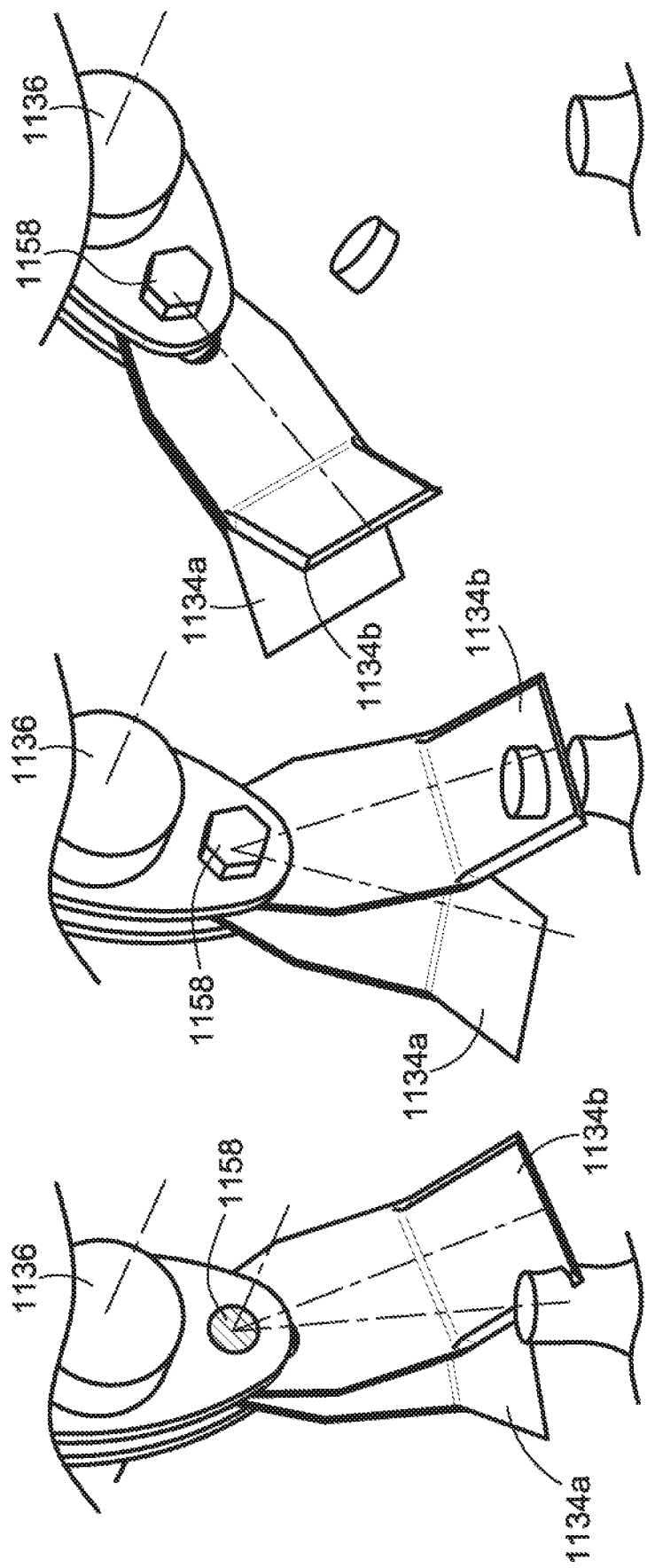
FIG. 19B is an enlarged perspective view illustrating one pair of mowing blades in the agricultural mowing device shown in FIG. 10 in a first orientation.
FIG. 19C is an enlarged perspective view illustrating one pair of mowing blades in the agricultural mowing device shown in FIG. 10 in a second orientation.
FIG. 19D is an enlarged perspective view illustrating one pair of mowing blades in the agricultural mowing device shown in FIG. 10 in a third orientation.

As best shown in FIG. 16, the material cut by the flail blades 1134 is discharged rearwardly into a rear discharge area 1140 where a deflector 1142 guides the mowed clippings to both of the adjacent rows of planted crop, to provide sun coverage and/or to decompose and feed both rows of planted crop. This covers the roots of the crop plants to provide shade and additional weed control within the planted rows. Referring to FIGS. 17-18, the cutting device 1112 further includes a sprayer input 1172 with one or more sprayer input tubes 1170 that are coupled to an end in the cutting device 1112 for delivering weed-control and/or other substances 1174.

Referring to FIGS. 19A-D, each blade assembly 1137 has two pairs of flailing cutters 1134 mounted on opposite ends of the blade assembly 1137. The other portions of each pair of flailing cutters are bent away from each other. The inner end portions of the cutters have elongated apertures through which fastening bolts 1161 pass to attach the cutters between a pair of an elliptical plate 1162 attached to a driven shaft 1158. Thus, the rotating shaft 1158 rotates each pair of cutters 1134 in a vertical circular path, so that the bent portions pass repeatedly over the surface of the soil. The side edges of the bent portions of the cutters thus slice the stems and leaves of any weeds or other material in the area between adjacent rows of the planted crop.

A flail mower is a type of powered garden/agricultural equipment, which is used to deal with heavier grass/scrub which a normal lawn mower could not cope with. Some smaller models are self-powered, but many are PTO driven implements, which can attach to the three-point hitches found on the rear of most tractors. This type of mower is best used to provide a rough cut to taller grass where contact with loose debris may be possible such as roadsides.

The flail mower gets its name from the use of "flails" attached to its rotating horizontal drum (also called tube, rotor, or axle). Many implement companies also refer to the flails as knives or blades. The rows of flails are usually staggered to provide a complete cut. The flails are attached to the drum using chain links or brackets, depending on the manufacturer. The rotating drum is perpendicular to the axis of the tractor. The PTO driveshaft along the tractor's axis must make a right angle through the use of a gearbox in order to transfer its rotational energy to the drum. As the drum rotates, centrifugal force pushes the flails outward.

Standard flails are shaped like an extruded "T" or "Y" and a chain attaches to the bottom. There are also proprietary flails with various shapes for shredding larger brush and others that leave a smooth, finish cut.

If a flail strikes an immovable object, it simply bounces off. Other rotary type mowers have a tendency to grab and throw the object out of the mower deck if its small enough. This fact makes the flail mower best suited for areas where thrown objects would cause damage.

Figure 20:
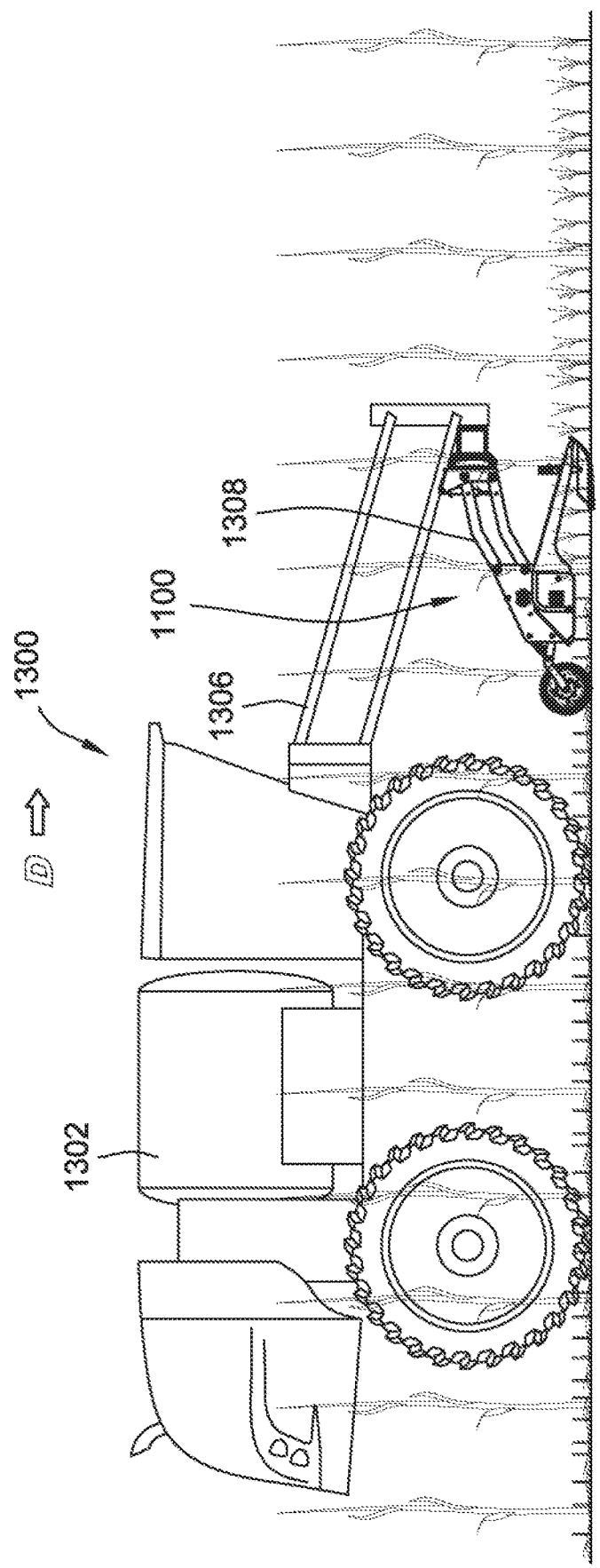
FIG. 20 illustrates a mower attached to a front end of a high-clearance sprayer type vehicle.
Figure 21:
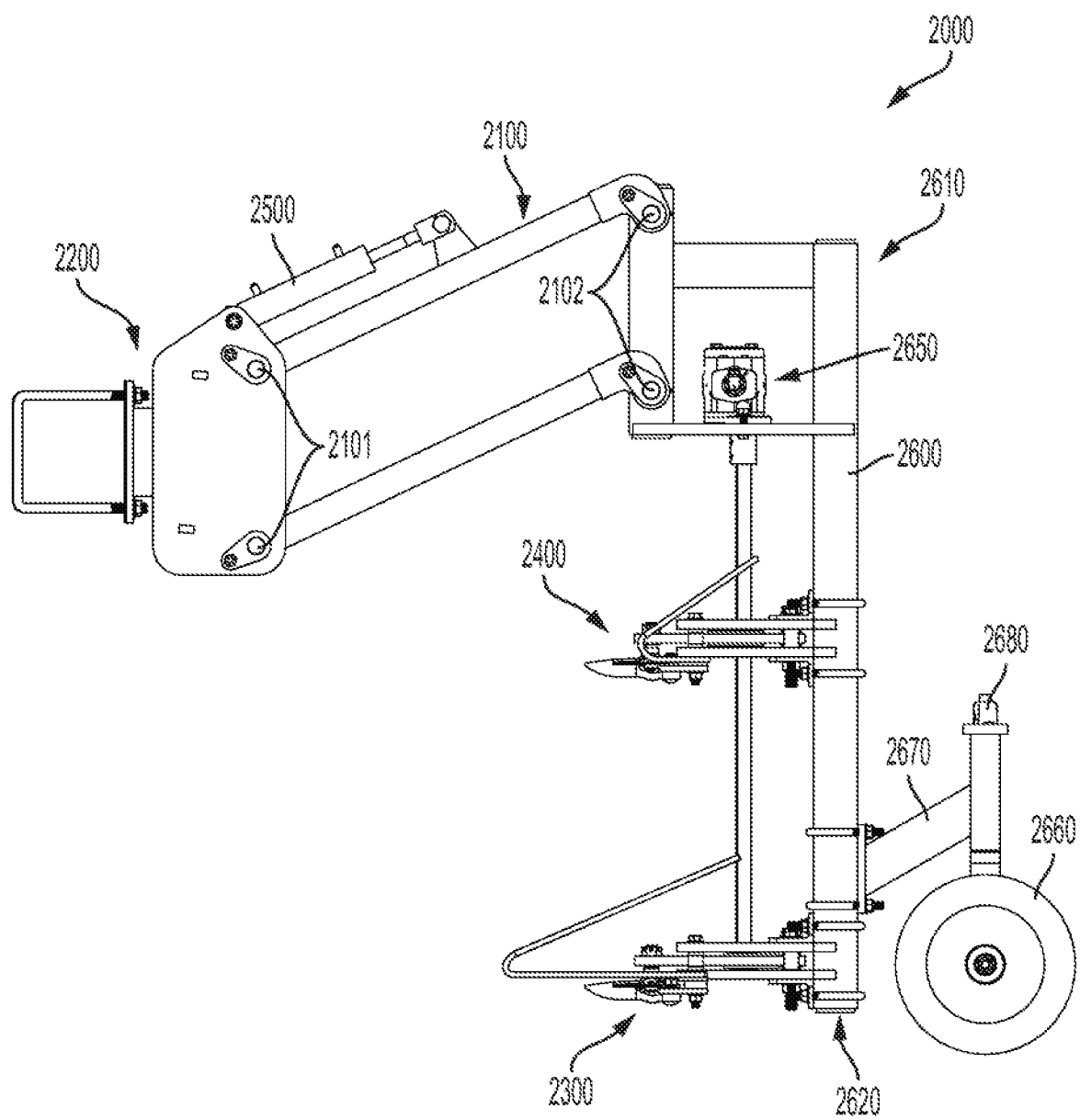
FIG. 21 is a side elevation view illustrating an agricultural mowing device with a primary weed-control unit and a secondary weed control unit.

FIG. 20 illustrates the mower attached to the front end of a high-clearance sprayer type vehicle 1300. The mower is mounted on a controllable support arm 1306 projecting from the front end of the vehicle 1300, so that the mower 1100 can be raised above the height of planted crops so that the mower does not mow crop plants at the end of a field. For example, the height of the mower can be controlled in response to a GPS signal and/or an optical camera row steering system.

Referring generally to FIGS. 21-26, an agricultural mowing device 2000 includes a primary weed-control unit 2300 for cutting material (e.g., weeds) between the rows in a planted field of crops (e.g., corn, soybeans, etc.), the same as or similar to implementations illustrated in FIGS. 10-20, except that the agricultural mowing device 2000 further includes a secondary weed-control unit 2400 for inter-row removal of unwanted material (e.g., weeds and/or other crops that grow among the rows in the planted field of crops) that generally grow at a higher height than the planted crops in the row.

In some implementations, as best shown in FIGS. 21-24, the agricultural mowing device 2000 includes a linkage assembly 2100 for attaching a cutting device to a vehicle (e.g., tractor) by a mounting assembly 2200. The linkage assembly 2100 includes a four-bar linkage. A vertical pivot pin 2201 (FIGS. 23-24) in the mounting assembly 2200 permits the linkage assembly 2100, and thus the primary weed-control unit 2300 and the secondary mowing unit 2400, to be pivoted horizontally relative to the tractor. Two pairs of horizontal pivot pins 2101 and 2102 (FIGS. 21-22) at opposite ends of the linkage assembly 2100 permit that linkage assembly 2110 to be pivoted vertically relative to the mounting assembly 2200. A hydraulic cylinder 2500 connected between the mounting assembly 2200 and the linkage assembly 2100 applies a controllable down pressure on the linkage assembly 2100 and thus on the primary and secondary weed-control units 2300 and 2400.

The agricultural mowing device 2000 includes a vertically adjustable shaft 2600 that is attached to the linkage assembly 2100 at an upper end 2610, and to the primary weed-control unit 2300 at a lower end 2620. The adjustable shaft 2600 is also attached to the secondary weed-control unit 2400 between the upper end 2610 and the lower end 2620. The secondary weed-control unit 2400 is positioned at a height tall enough where secondary weed-control unit 2400 will cut off weeds or other material without cutting the planted crop plants. The primary and secondary weed-control units 2300 and 2400 are driven by a single motor 2650. By way of example, the motor 2650 is a hydraulic motor, an electric motor, an internal combustion engine, or the like, or in any combination thereof. Additionally or alternatively, the motor is mechanically connected to the PTO on a tractor, driving all at once. However, multiple motors are also contemplated to drive each of the weed-control units 2300 and 2400 separately.

The agricultural mowing device 2000 further includes a rear gauge wheel 2660 that is coupled to the adjustable shaft 2600 via, for example, a gauge frame 2670. The gauge wheel 2660 aids in adjusting the height of the weed-control units 2300 and 2400 over uneven terrain or weeds. It is also contemplated that the agricultural mowing device 2000 includes multiple gauge wheels instead of a single gauge wheel 2660. The gauge wheel 2660 is coupled to a depth adjuster 2680, which aids in adjusting the height of the weed-control units 2300 and 2400. In some implementations, the depth adjuster 2680 includes a spring-loaded element (not shown) such that the primary and secondary weed-control units 2300 and 2400 automatically adjust in height when passing over uneven terrain (e.g., the weed-control units 2300 and 2400 float up and down following contour of the terrain). Additionally or alternatively, the depth adjuster 2680 includes a motor drive unit (not shown). Additionally or alternatively, the depth adjuster 2680 includes a manual adjuster that manually positions the weed-control units 2300 and 2400 at fixed distances on the adjustable shaft 2600.

Figure 22:
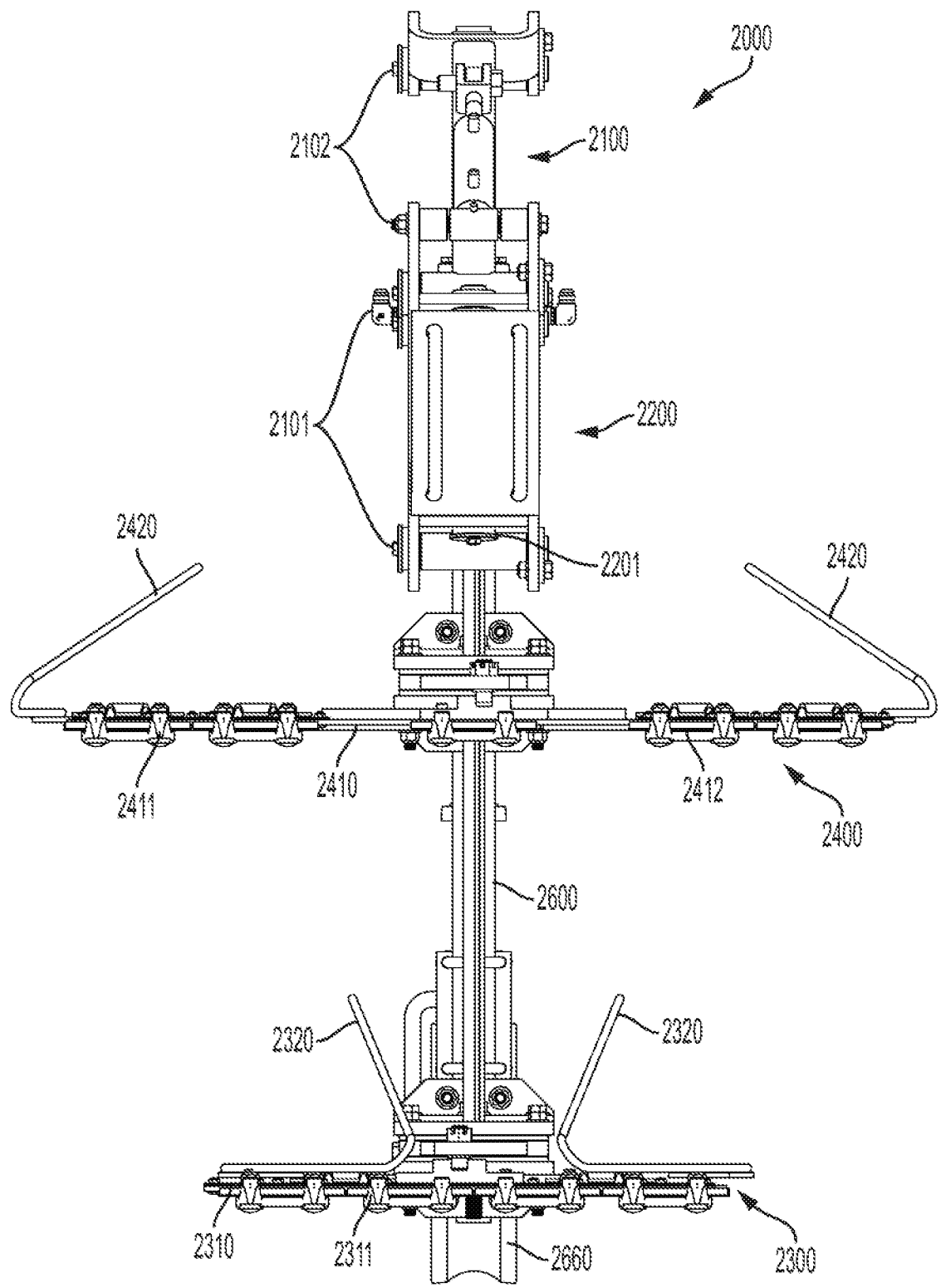
FIG. 22 is a front elevation view illustrating the agricultural mowing device shown in FIG. 21.
Figure 23:
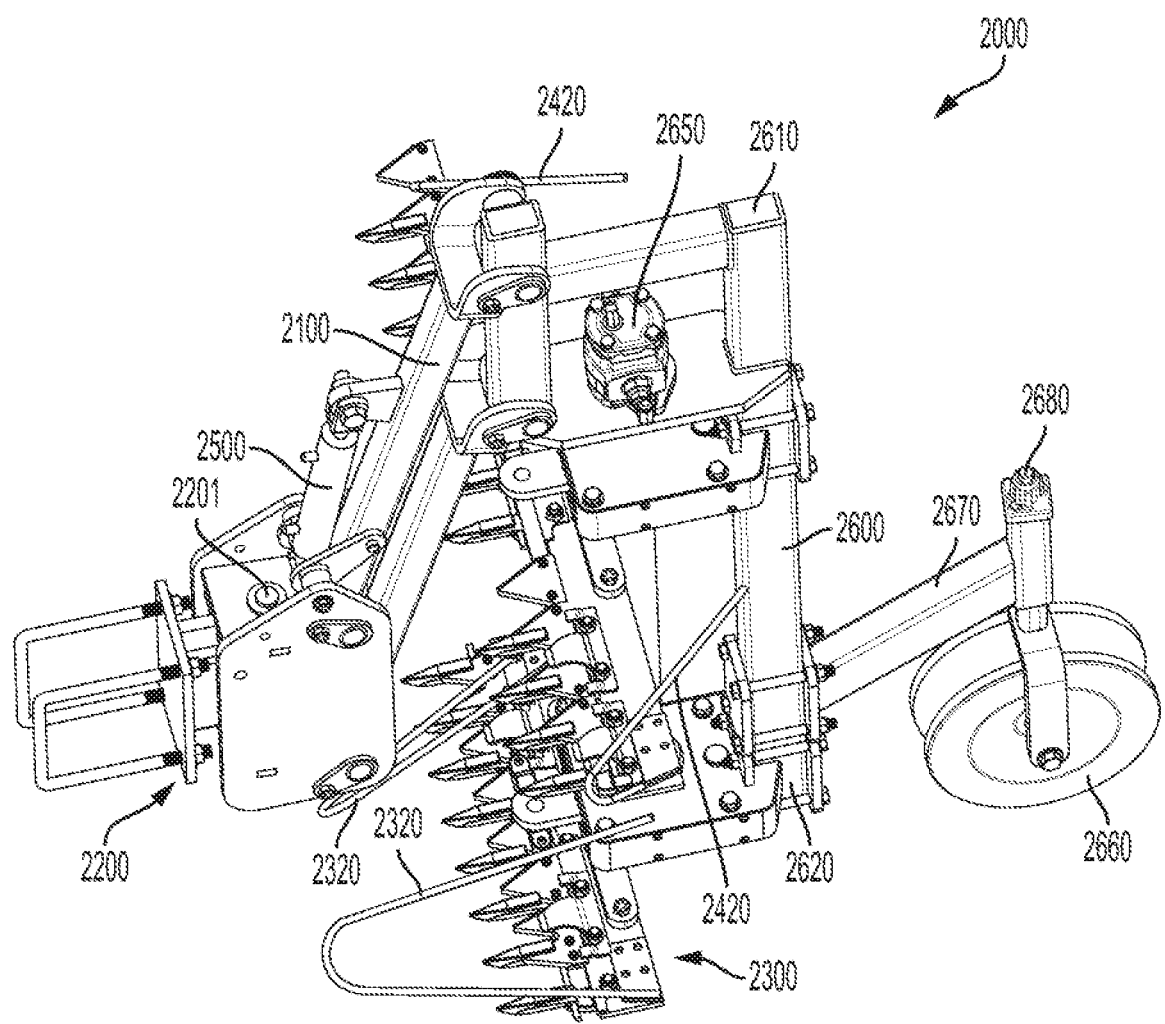
FIG. 23 is a top perspective view illustrating the agricultural mowing device shown in FIG. 21.
Figure 24:
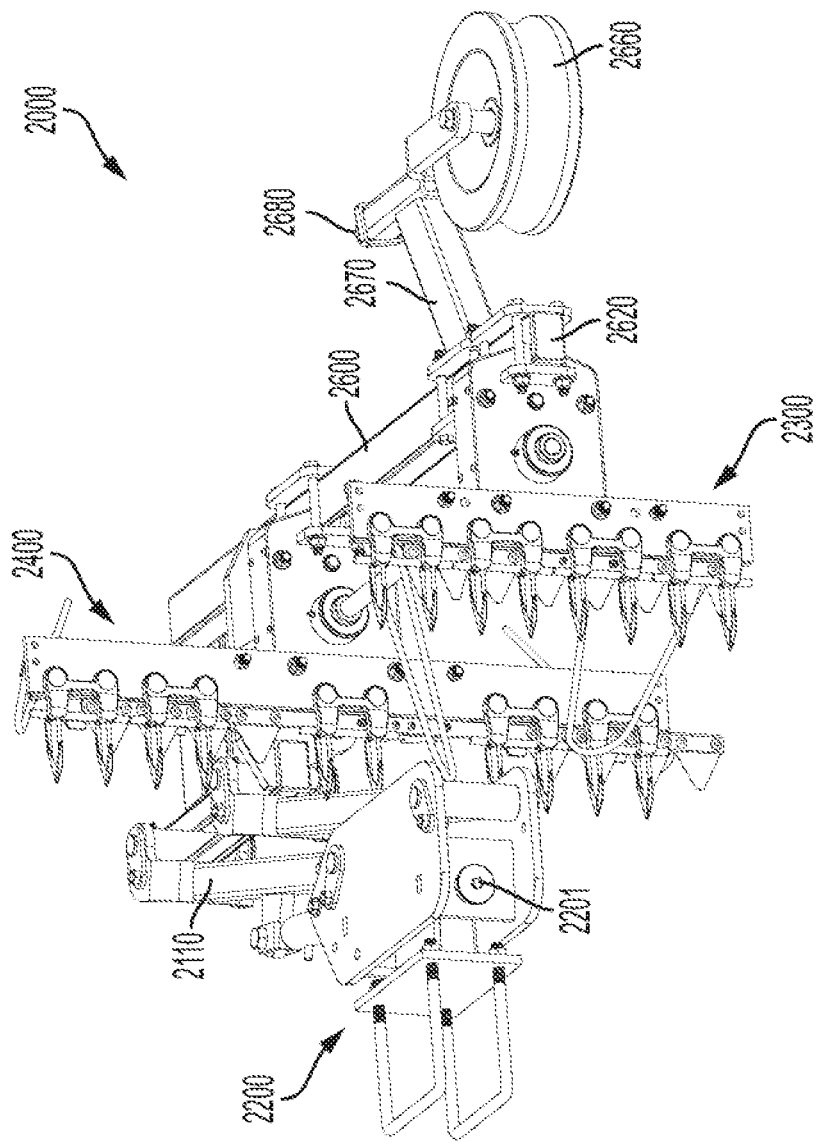
FIG. 24 is a bottom perspective view illustrating the agricultural mowing device shown in FIG. 21.

Referring to FIG. 22, the primary weed-control unit 2300 includes a cutting assembly 2310. Similarly, the secondary weed control unit 2400 includes a cutting assembly 2410. The cutting assemblies 2310 and 2410 may include rotating blades, oscillating blades, flail blades, a rotary cutter, a rotating cutter, or an oscillating cutter, or the like, or in any combination thereof. As an example, the cutting assemblies 2310 and 2410 each includes a plurality of sickles. In some embodiments, the cutting assembly 2310 of the primary weed control unit 2300 includes one set of sickles 2311 positioned along the entire length of the cutting assembly 2310. The cutting assembly 2410 of the secondary weed control unit 2400 includes two sets of sickles 2411 and 2412 located on opposite sides of the secondary weed control unit 2400. There is a gap between the two sets of sickles 2411 and 2412, such that a majority of the weeds being cut by the primary weed control unit 2300 are not cut twice up top by the secondary weed control unit 2400 (as best shown in FIGS. 25A-B).

Figure 25A:
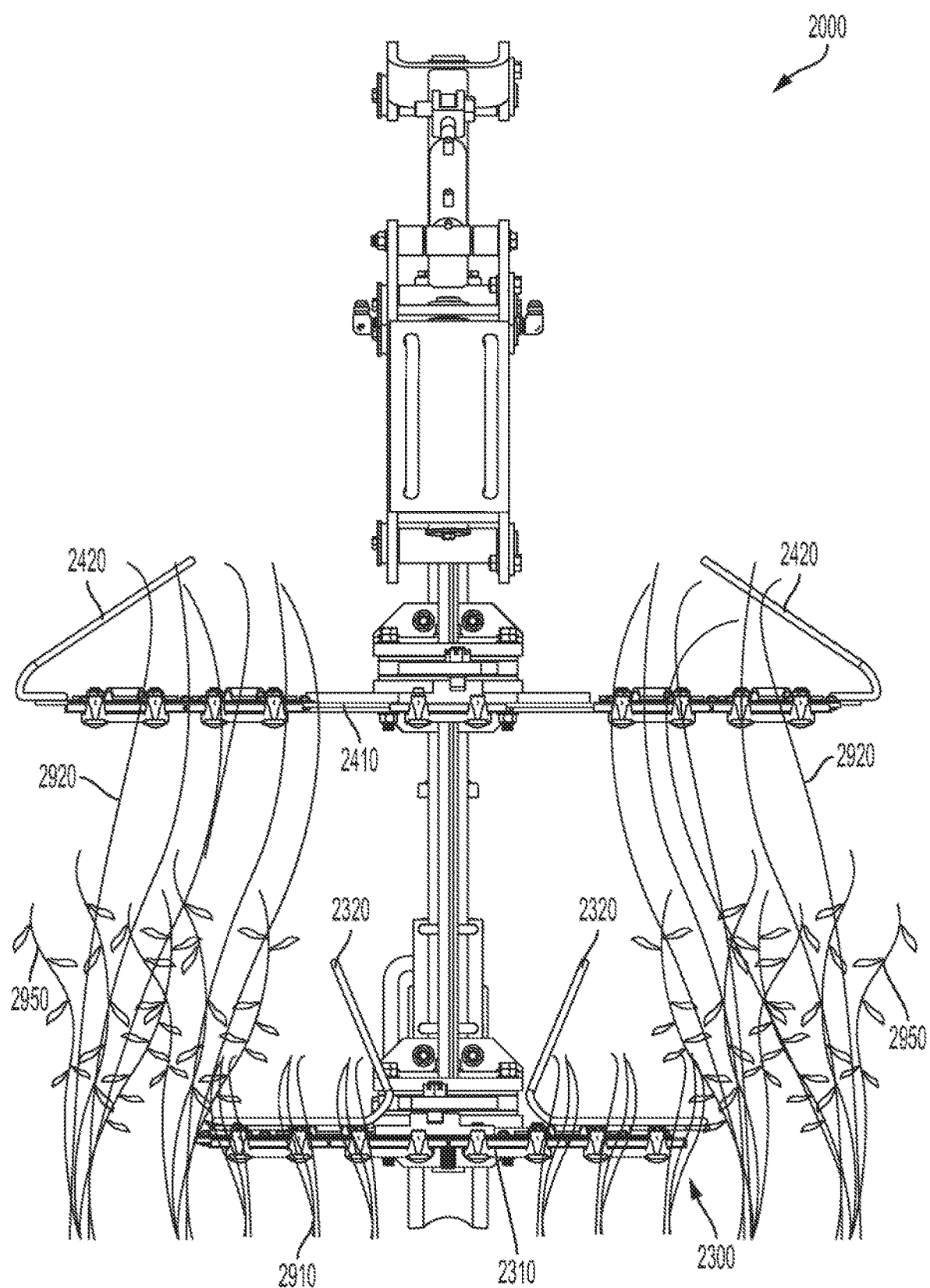
FIG. 25A illustrates a front elevation view of the agricultural mowing device shown in FIG. 21 prior to mowing a set of plant matter.
Figure 25B:
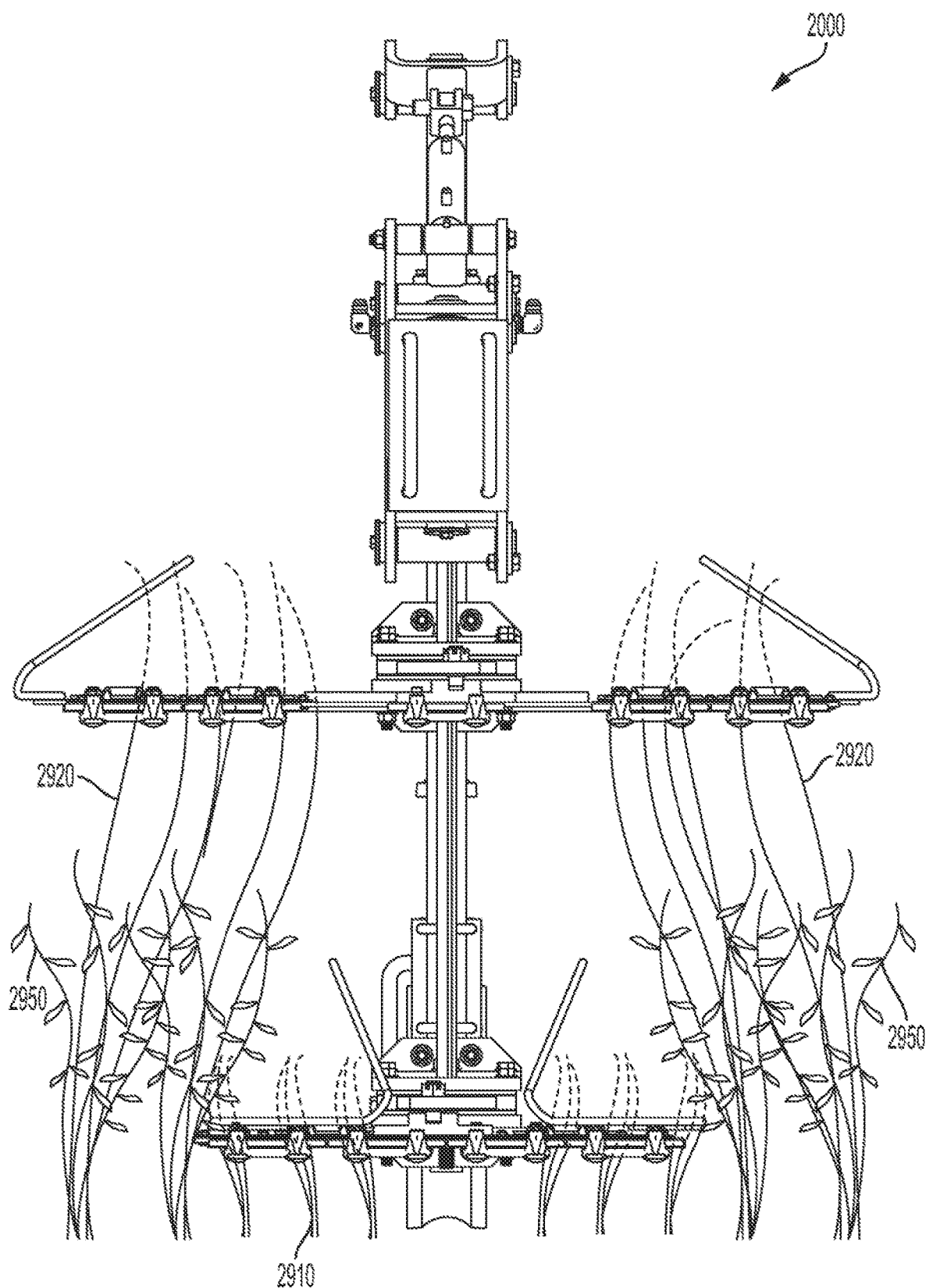
FIG. 25B illustrates a front elevation view of the agricultural mowing device shown in FIG. 21 after mowing a set of plant matter.

Referring to FIGS. 25A-B, the primary weed-control unit 2300 also includes a pair of tapered deflectors 2320 positioned in front of and at opposite ends of the cutting assembly 2310 for guiding and lifting adjacent rows of planted matter 2950 away from the cutting assembly 2310. The secondary weed-control unit 2400 includes a pair of tapered deflectors 2420 located in front of and at opposite ends of the cutting assembly 2410 for guiding and pulling the unwanted material 2920 (e.g., weeds and/or regrowth) towards the cutting assembly 2410. The cutting assembly 2310 of the primary weed-control unit 2300 is narrow enough to fit between adjacent rows of planted matters. The cutting assembly 2410 of the secondary weed-control unit 2400 extends into the rows of planted matter 2950.

As best shown in FIG. 25A, prior to cutting, weeds 2910 can grow between adjacent rows of planted matter 2950. In addition, weeds 2920 can grow within the rows of planted matter 2950, which often grow at a higher height than the planted matter 2950. Turning to FIG. 25B, as the agricultural mowing device 2000 advances between adjacent rows of planted matter 2950, the primary weed-control unit cuts growing weeds 2910 between the rows of planted matter 2950 to clear a reduced or weed-free path. The secondary weed-control unit cuts growing weeds 2920 among the rows of planted matter 2950 to reduce re-growth.

Additionally or alternatively, the agricultural mowing device 2000 includes a sprayer input (not shown) with one or more sprayer input tubes that are coupled to an end of the weed-control unit for delivering weed-control and/or other substances. The weed-control substance is helpful in reducing and/or preventing the reappearance of weeds.

Figure 26:
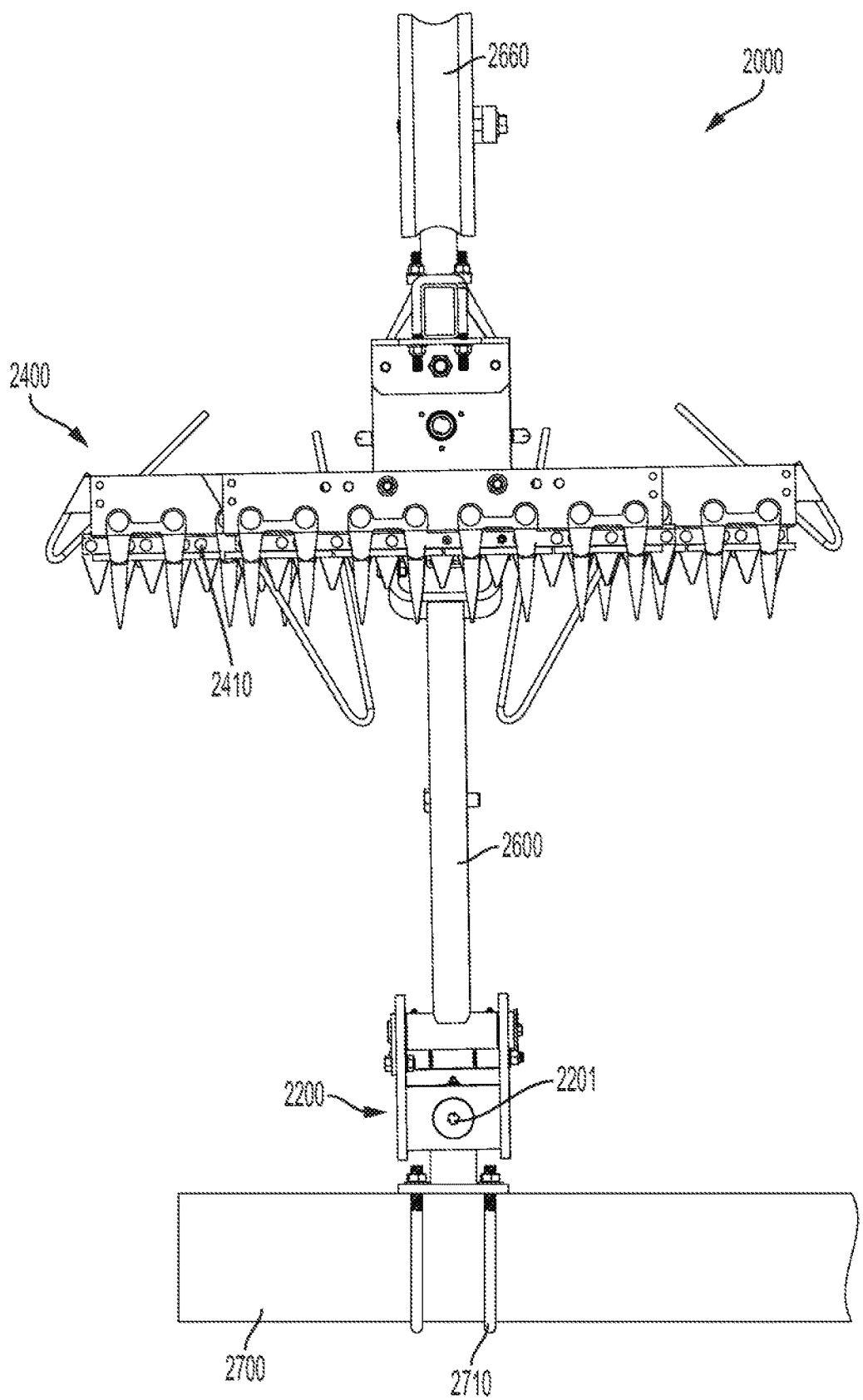
FIG. 26 is a bottom view illustrating the agricultural mowing device shown in FIG. 21 attached to a mounting frame.
Figure 27:
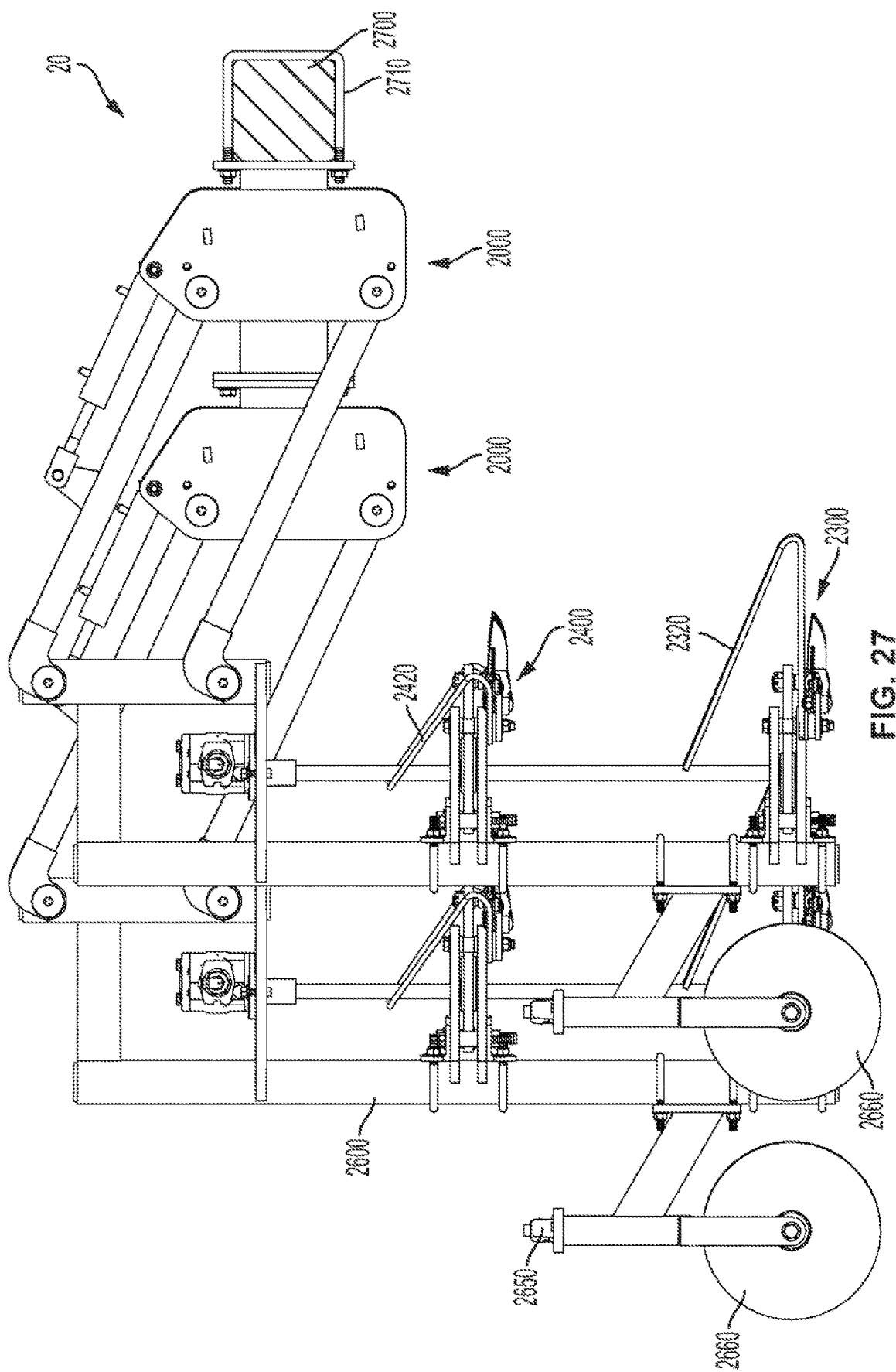
FIG. 27 is a side elevation view illustrating an agricultural mowing system with a plurality of agricultural mowing devices shown in FIG. 21.
Figure 28:
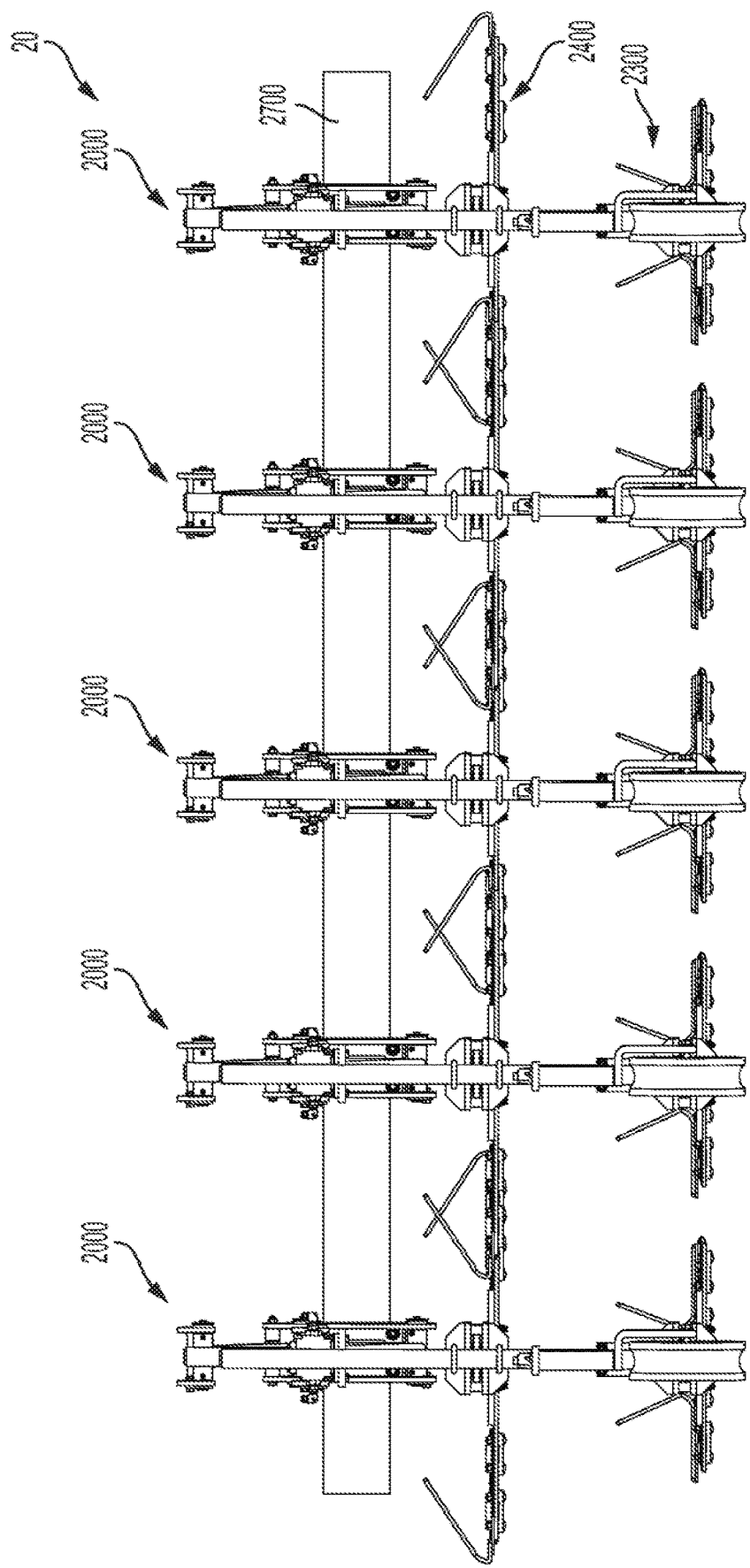
FIG. 28 is a rear elevation view illustrating the agricultural mowing system shown in FIG. 27.

Referring to FIGS. 26-29, an agricultural system 20 has a plurality of agricultural mowing devices 2000 with respective primary and secondary weed-control units 2300 and 2400, for mowing multiple rows at the same time. Each agricultural mowing devices 2000 has a rear gauge wheel 2660 that is mounted to an adjustable shaft 2600. The agricultural mowing devices 2000 are coupled to one another via, for example, a mounting frame 2700. As best shown in FIG. 26, an agricultural mowing device 2000 is attached to the mounting frame 2700 via a pair of U-shaped bolts 2710. Alternatively, an agricultural mowing device 2000 is attached to the mounting frame 2700 via a mounting plate 2720 (FIG. 29). The agricultural mowing devices 2000 are individually driven by their respective motors 2650. Additionally or alternatively, the agricultural mowing devices 2000 are driven by a single motor that are coupled to each agricultural mowing device 2000 via, for example, a rotating belt (not shown). As such, the single motor drives simultaneously each of the agricultural mowing devices 2000. As best shown in FIG. 29, the agricultural mowing devices 2000 are spaced from one another and positioned more or less forward relative to one another in the direction of advancement of the agricultural system 20, such that portions of the respective secondary weed-control units 2400 overlap one another to provide better coverage of the planted crops.

Additionally or alternatively, the secondary weed-control unit is located on an ancillary mowing device that does not include a primary weed-control unit. The ancillary mowing device includes a vertically adjustable shaft that is coupled to the secondary weed-control unit for removing (e.g., cutting) weeds above planted crops growing among the planted crops. An ancillary system includes a plurality of ancillary mowing devices. The ancillary agricultural system aids a primary agricultural system (e.g., implementations illustrated in FIGS. 10-20) to cut regrowth among the rows of planted matter, where the primary agricultural system cuts rows of weeds closer to the ground between the rows of planted matter.

In addition to weed control, it is also contemplated that the agricultural devices and systems described above are capable of being broadly used in regenerative farming systems. For example, in a field of cash crops and living cover crops (e.g., a legume cover crop), the agricultural system supplies fertilizer to the cash crop via the nitrogen fixation of the legume. The agricultural mowing devices would be used to control weeds, but also to cut the cover crop so that the clippings decompose, thereby fertilizing the cash crop.

It will be evident to those skilled in the art that the invention is not limited to the details of the foregoing illustrated embodiment and that the present invention may be embodied in other specific forms without departing from the spirit or essential attributes thereof. For example, the present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural mowing device comprising:
   a shaft capable of being advanced in a field between two adjacent rows of planted matter;
   a first cutting device mounted to a lower section of the shaft, the first cutting device extending laterally from the shaft to a distance covering only a distance between the two adjacent rows, the first cutting device cutting plant matter that grows between the two adjacent rows; and
   a second cutting device mounted at a height higher than a height of the first cutting device measured vertically from a ground surface, the second cutting device extending laterally from the shaft to a distance covering at least a portion of at least one of the two adjacent rows, the second cutting device cutting plant matter that grows in the at least one of the two adjacent rows, the second cutting device including an upper connector on which an upper cutting member is mounted, the upper cutting member including a plurality of sickle teeth positionable at each of two end portions of the upper connector such that a gap exists at a center portion of the upper connector.

2. The agricultural mowing device of claim 1, wherein the first cutting device includes a lower connector on which a lower cutting member is mounted.

3. The agricultural mowing device of claim 2, wherein the lower cutting member includes at least one of a plurality of sickle knives, a plurality of rotatable blades, a plurality of oscillating blades, a plurality of flail blades, a rotary cutter, a rotating cutter, an oscillating cutter, or any combination thereof.

4. The agricultural mowing device of claim 1, wherein the plurality of sickle teeth is continuous along a length of the upper connector.

5. The agricultural mowing device of claim 1, wherein the plurality of sickle teeth is positionable at each of the two end portions and a part of the center portion of the upper connector of the second cutting device, such that two gaps exist at the center portion of the upper connector.

6. The agricultural mowing device of claim 2, further comprising at least one motor coupled to at least one of the cutting devices for driving the respective cutting member of the at least one of the cutting devices.

7. The agricultural mowing device of claim 6, wherein the at least one motor is configured to mechanically couple to a power source on an agricultural vehicle, and wherein the at least one motor includes an electric motor, a hydraulic motor, an internal combustion engine, or any combination thereof.

8. The agricultural mowing device of claim 6, wherein a first motor of the at least one motor is coupled to the first cutting device, a second motor of the at least one motor being coupled to the second cutting device.

9. The agricultural mowing device of claim 8, wherein the first motor and the second motor are the same type of motor.

10. The agricultural mowing device of claim 1, wherein the first cutting device includes a pair of deflectors in front of the first cutting device for pushing the two adjacent rows of planted matter away from the first cutting device.

11. The agricultural mowing device of claim 1, wherein the second cutting device includes a pair of deflectors in front of the second cutting device for pulling plant matter from the adjacent rows of planted matter into the second cutting device.

12. The agricultural mowing device of claim 1, further comprising a depth adjuster for adjusting the vertical distance between the cutting devices and the ground beneath the cutting devices.

13. The agricultural mowing device of claim 12, wherein the depth adjuster includes a gauge wheel positionable rearwardly relative to the cutting devices.

14. An agricultural system comprising:
a mounting frame for attachment to an agricultural vehicle; and
a plurality of agricultural mowing devices for mowing plant matter between a plurality of rows in a planted field, the plurality of agricultural mowing devices including a first agricultural mowing device and a second agricultural mowing device positionable less forwardly relative to the first agricultural mowing device, the first agricultural mowing device and the second agricultural mowing device being positionable between two adjacent rows of planted matter, each of the first agricultural mowing device and the second agricultural mowing device including
  a first cutting device mounted to a lower section of a shaft and extending laterally from the shaft to a first distance covering only a space between the two adjacent rows,
  a second cutting device mounted to a middle section of the shaft and extending laterally from the shaft to a distance covering at least a portion of at least one of the two adjacent rows, and
  a mounting assembly mounted to an upper section of the shaft for attachment to the mounting frame;
  wherein the second cutting devices of the first agricultural mowing device and the second agricultural mowing device overlap each other in the portion of the at least one of the two adjacent rows.

15. The agricultural system of claim 14, wherein the first and second agricultural mowing devices are mounted to the mounting frame.

16. The agricultural system of claim 14, wherein the first agricultural mowing device is positionable at a lateral distance from the second agricultural mowing device measured from a first shaft of the first agricultural mowing device to a second shaft of the second agricultural mowing device, and wherein the lateral distance is substantially the same as a width of the row of planted matter between the first agricultural mowing device and the second agricultural mowing device.

17. The agricultural system of claim 14, wherein the first agricultural mowing device is positionable more forwardly relative to the second agricultural mowing device such that an end portion of the second cutting device of the first agricultural mowing device overlaps an end portion of the second cutting device of the second agricultural mowing device in a lateral dimension, thereby covering the entire width of the row of planted matter between the two agricultural mowing devices.

18. The agricultural system of claim 17, wherein the first agricultural mowing device is positionable adjacent to the second agricultural mowing device.

* * * * *